US010068358B2

(12) United States Patent
Kelly et al.

(10) Patent No.: US 10,068,358 B2
(45) Date of Patent: Sep. 4, 2018

(54) MODIFYING WAGERING GAME GRAPHICS

(71) Applicant: Bally Gaming, Inc., Las Vegas, NV (US)

(72) Inventors: Sean P. Kelly, Skokie, IL (US); Craig J. Sylla, Round Lake, IL (US); Peter R. Anderson, Glenview, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 328 days.

(21) Appl. No.: 14/866,294

(22) Filed: Sep. 25, 2015

(65) Prior Publication Data

US 2016/0092069 A1  Mar. 31, 2016

Related U.S. Application Data

(60) Provisional application No. 62/056,329, filed on Sep. 26, 2014.

(51) Int. Cl.
 *G07F 17/32* (2006.01)
 *G06T 11/60* (2006.01)

(52) U.S. Cl.
 CPC ............ *G06T 11/60* (2013.01); *G07F 17/323* (2013.01); *G07F 17/3223* (2013.01); *G07F 17/3227* (2013.01)

(58) Field of Classification Search
 CPC . G07F 17/323; G07F 17/3223; G07F 17/3227
 USPC ........................................................ 463/25
 See application file for complete search history.

(56) References Cited

U.S. PATENT DOCUMENTS

| 8,157,641 | B2 | 4/2012 | Englman et al. |
| 8,257,169 | B2 | 9/2012 | Englman |
| 8,357,040 | B2 | 1/2013 | Ansari et al. |
| 8,376,845 | B2 | 2/2013 | Cockerille et al. |
| 8,663,005 | B2 | 3/2014 | Anderson et al. |
| 8,762,199 | B2 | 6/2014 | Schwartz et al. |
| 8,771,066 | B2 | 7/2014 | Adiraju et al. |
| 8,821,273 | B2 | 9/2014 | Cockerille et al. |

(Continued)

OTHER PUBLICATIONS

Co-pending U.S. Appl. No. 13/289,549, filed Nov. 5, 2010, 72 pages.

*Primary Examiner* — Omkar Deodhar
*Assistant Examiner* — Shauna-Kay Hall
(74) *Attorney, Agent, or Firm* — David J. Bremer; Grant A. Dingledine

(57) ABSTRACT

A wagering game system and its operations are described herein. In some embodiments, the operations can include intercepting video data from a graphics controller of a wagering game machine. In some instances, the video data depicts wagering game content for a wagering game. In some examples, a first content controller, associated with the wagering game, is configured to cause the graphics controller to generate the video data. The operations can further include performing a graphical analysis of the video data via a second content controller independent from the first content controller. The operations can further include after performing the graphical analysis, modifying the video data via the second content controller. In some examples modifying the video data modifies an appearance of a first portion of the wagering game content without modifying an appearance of a second portion of the wagering game content.

25 Claims, 12 Drawing Sheets

(56) References Cited

U.S. PATENT DOCUMENTS

| | | | | |
|---|---|---|---|---|
| 2005/0054423 | A1* | 3/2005 | Wadleigh | G07F 17/32 463/20 |
| 2005/0255912 | A1* | 11/2005 | Love | G06F 3/1423 463/30 |
| 2006/0009286 | A1* | 1/2006 | Durham | G07F 17/3211 463/30 |
| 2008/0268961 | A1* | 10/2008 | Brook | A63F 13/12 463/42 |
| 2010/0240455 | A1* | 9/2010 | Gagner | G07F 17/32 463/30 |
| 2011/0028203 | A1* | 2/2011 | Agarwal | G07F 17/3211 463/20 |
| 2011/0034241 | A1 | 2/2011 | Englman et al. | |
| 2012/0071237 | A1* | 3/2012 | Cockerille | G07F 17/3211 463/30 |
| 2012/0100915 | A1* | 4/2012 | Margalit | G06Q 30/02 463/31 |

* cited by examiner

MODIFYING WAGERING GAME GRAPHICS

RELATED APPLICATIONS

This application claims the priority benefit of U.S. Provisional Application Ser. No. 62/056,329 filed Sep. 26, 2014.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Bally Gaming, Inc.

TECHNICAL FIELD

Embodiments of the inventive subject matter relate generally to wagering game systems and networks that, more particularly, modify wagering game graphics.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Wagering game applications are created with graphical content that has specific artwork. The appearance of the artwork is important for several reasons. For example, the artwork can convey a consistent look and feel to the wagering game. The artwork can identify a particular game theme or manufacturer. The artwork can display important information about how to play the game. The artwork can identify prizes or payouts that can be won by wagering in the game. The artwork can specify wagering game play and game outcomes though the use of game symbols. Furthermore, the characteristics of the artwork, such as the imagery, animations, etc., are visibly prominent to the player and, thus, are important visual elements of wagering games that add to the excitement and fun of wagering games. The graphical content for a wagering game is typically created and packaged into a wagering game application by the game manufacturer of the wagering game application. The wagering game application is then provided to a casino (e.g., with a wagering game machine and/or to install on a wagering game machine). However, the graphical content, and hence the artwork, is not typically changeable until a new release of the wagering game application is provided by the game manufacturer.

BRIEF DESCRIPTION OF THE DRAWING(S)

Embodiments are illustrated in the Figures of the accompanying drawings in which.

Figure 9:
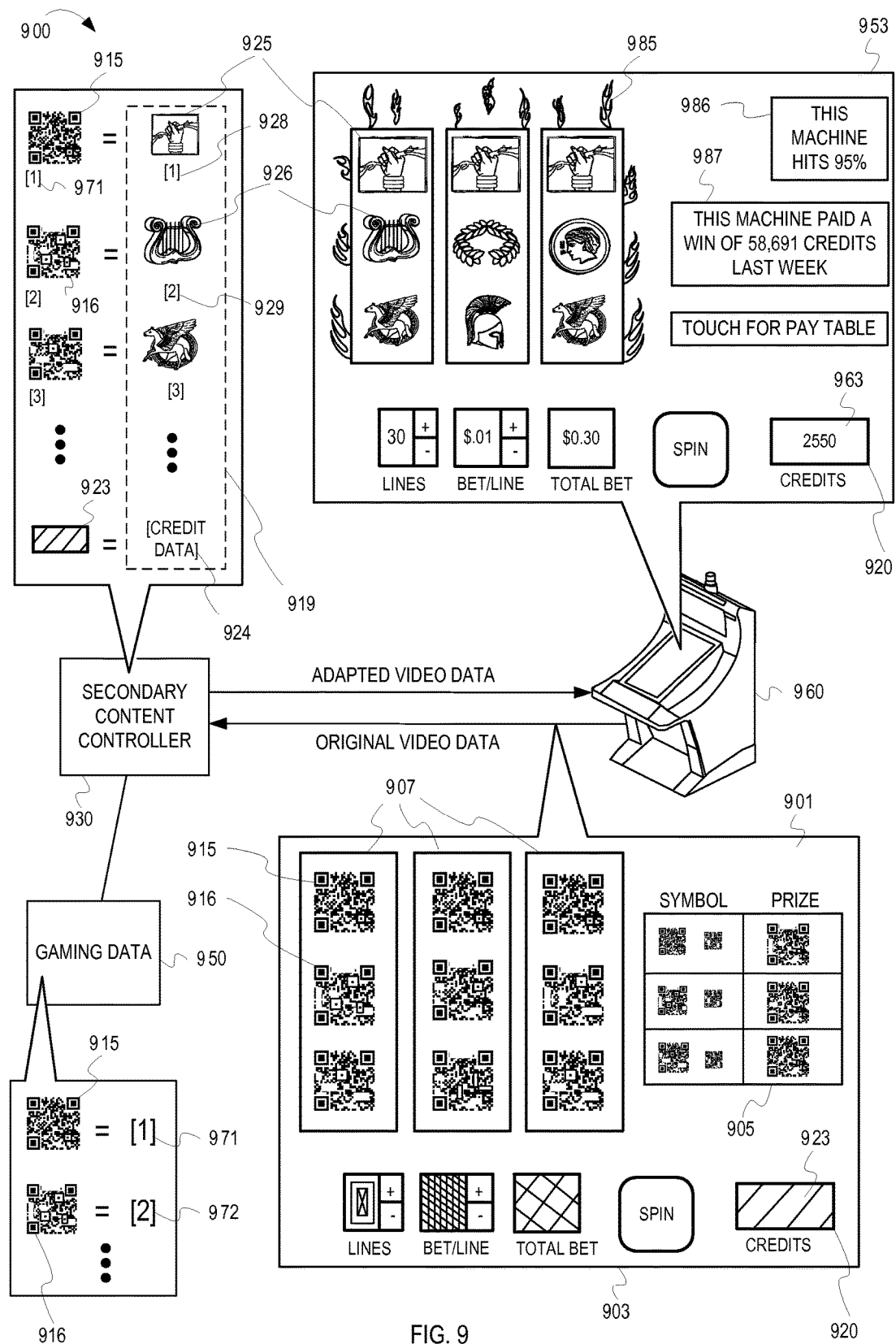
Figure 10:
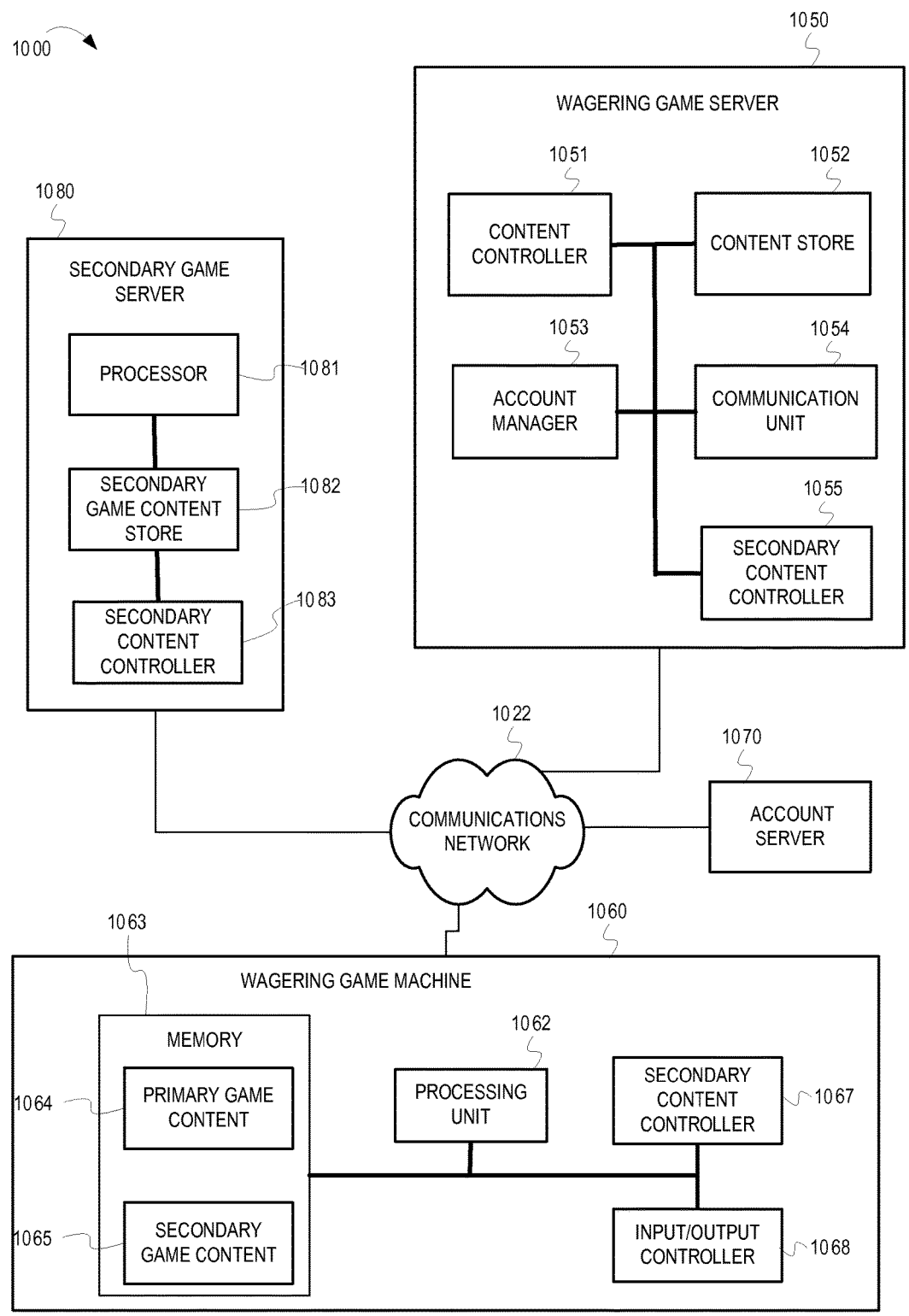
Figure 11:
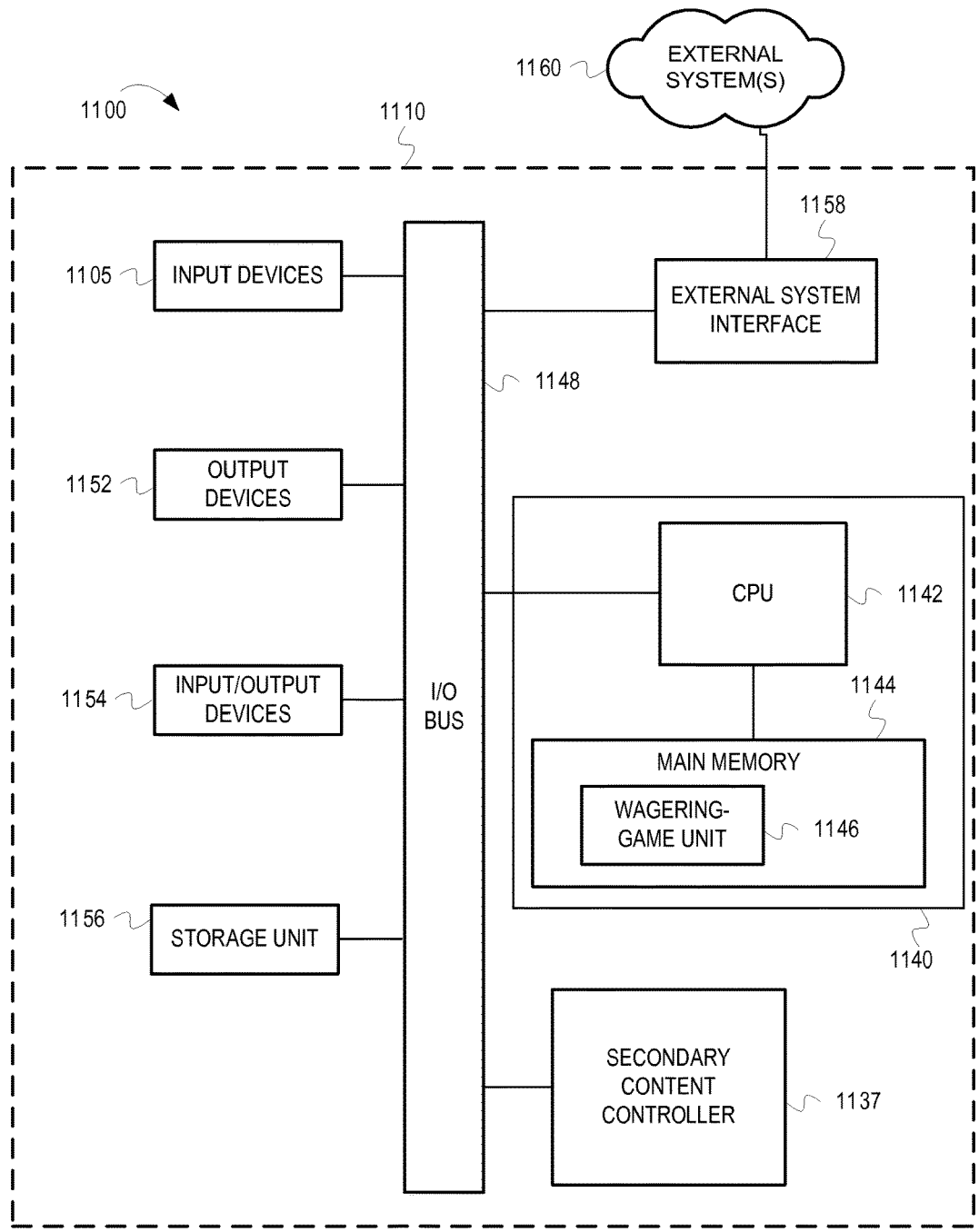
Figure 12:
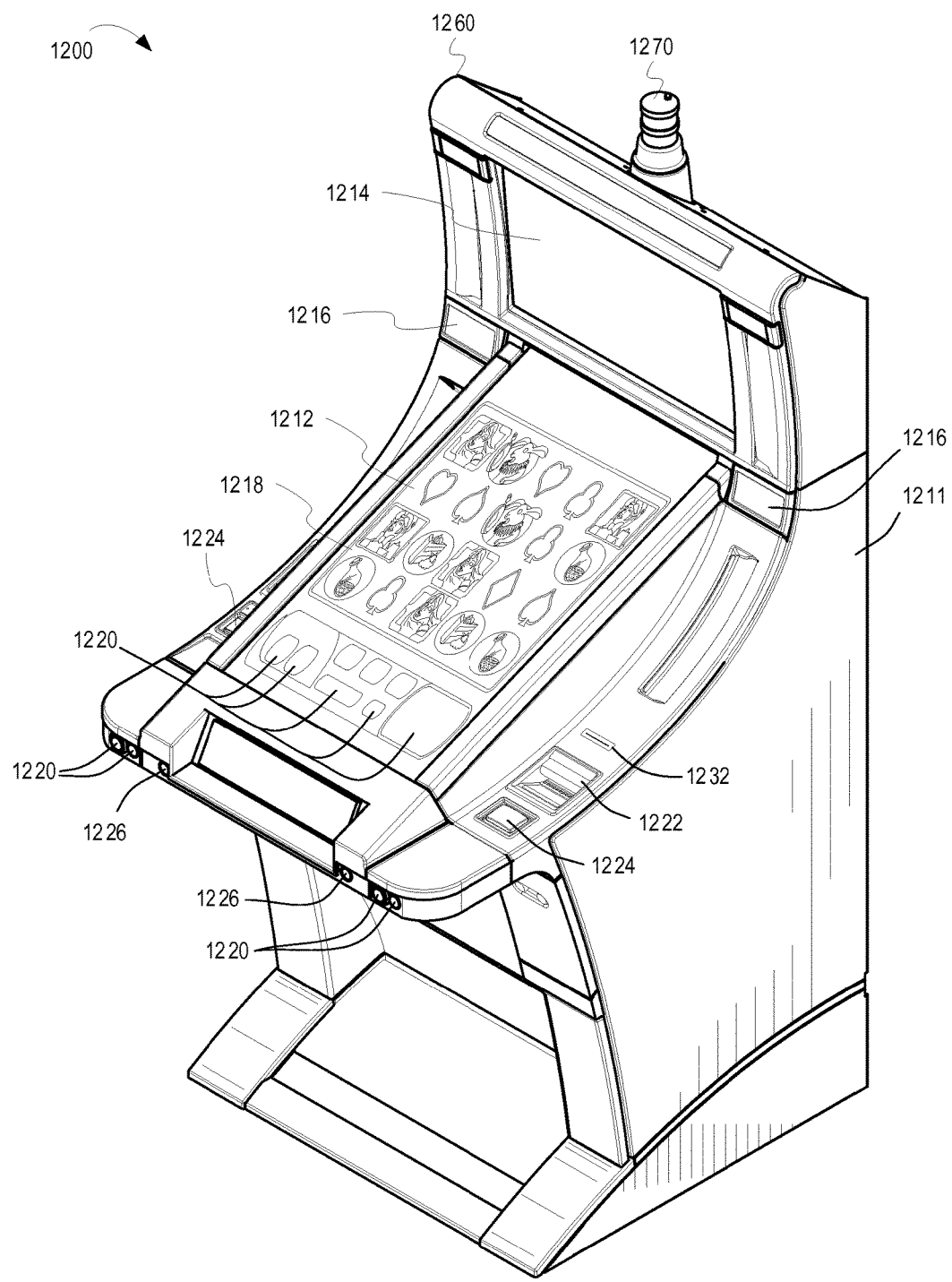

FIGS. 4, 5, 6, 7, and 8 are illustrations of a wagering game system 400, according to some embodiments;

FIG. 9 is an illustration of a wagering game system 900, according to some embodiments;

FIG. 10 is an illustration of a wagering game system architecture 1000, according to some embodiments;

FIG. 11 is an illustration of a wagering game machine architecture 1100, according to some embodiments; and FIG. 12 is an illustration of a wagering game system 1200, according to some embodiments.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

While the inventive subject matter can be embodied in many different forms, there is shown in the drawings and will herein be described in detail some embodiments (e.g., preferred embodiments) with the understanding that the present disclosure is to be considered as an exemplification of the principles of the inventive subject matter and is not intended to limit the broad aspect of the inventive subject matter to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" can represent the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account"

may be referred to herein in either context. Further, in some embodiments herein, the word "gaming" may be used interchangeably with the word "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or online casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Further, some embodiments of the inventive subject matter describe examples of modifying wagering game graphics in a network wagering venue (e.g., an online casino, a wagering game website, a wagering network, etc.) using a communication network. Embodiments can be presented over any type of communications network that provides access to wagering games, such as a public network (e.g., a public wide-area-network, such as the Internet), a private network (e.g., a private local-area-network (LAN) gaming network), a peer-to-peer network, a wireless network, a telecommunications network, etc., or any combination of networks. Multiple users can be connected to the networks via computing devices. The multiple users can have accounts that utilize specific services, such as account-based wagering services (e.g., account-based wagering game websites, account-based casino networks, etc.).

Introduction

This section provides an introduction to some embodiments.

As specified previously, the appearance of artwork in graphical content of a wagering game is important. However, the artwork provided with the graphical content is not typically changeable until a new version of the wagering game is provided by a gaming manufacturer. Developing a new version of a wagering game, with new artwork, can include a significant amount of effort, which can take a significant amount of time. However, there may be circumstances in which it may be desirable to change some, or all, of the artwork of wagering game content without needing the manufacturer to perform the typical process of updating the game software. Furthermore, it may be desirable in some circumstances for any entity, including a game manufacturer, a casino, etc., to change artwork in a wagering game based on events that were unforeseen when the wagering game software was generated and shipped from the gaming manufacturer. For example, it may be desirable to change game artwork based on seasonal data or current events, based on needs of a casino to promote an upcoming event or contest, based on a shift in advertising needs for a casino, based on a popularity (or unpopularity) of a given image in the artwork, based on secondary game events, etc.

Some embodiments of the inventive subject matter are directed to changing the appearance of the artwork of graphical content of a wagering game at the time that the wagering game is run. For example, some embodiments are directed to obtaining a first video frame for a wagering game (e.g., from a graphics card of a wagering game machine). Then, in some embodiments, a first graphical item on the first video frame is selected (e.g., via machine recognition). Based on the selection of the first graphical item, a new, second video frame is generated, which may include a copy of at least some of the video data from the first video frame (e.g., some artwork from the first video frame) as well as an additional, second graphical item that is placed into the second video frame at a location that corresponds to the first graphical item. The second graphical item can replace or overlay the first graphical item in the second video frame so that the first graphical item is obscured (e.g., not seen or semi-obscured). In other examples, the second graphical item highlights or integrates with the first graphical item (e.g., changes its color, adds a highlight effect, etc.). In some embodiments, the second graphical item is added without having to recompile the wagering game and without having to modify any programming from the wagering game. In other words, in some examples, the game logic itself is not involved with adding the second graphical item, but a different source (e.g., an independent content controller referred to herein as a "secondary content controller") modifies the video appearance of the content and adds (e.g., overlays) the second graphical item into the second video frame. Afterwards, the second video frame is presented for the wagering game instead of the first video frame. A more specific example is described in FIG. 1.

Figure 1:
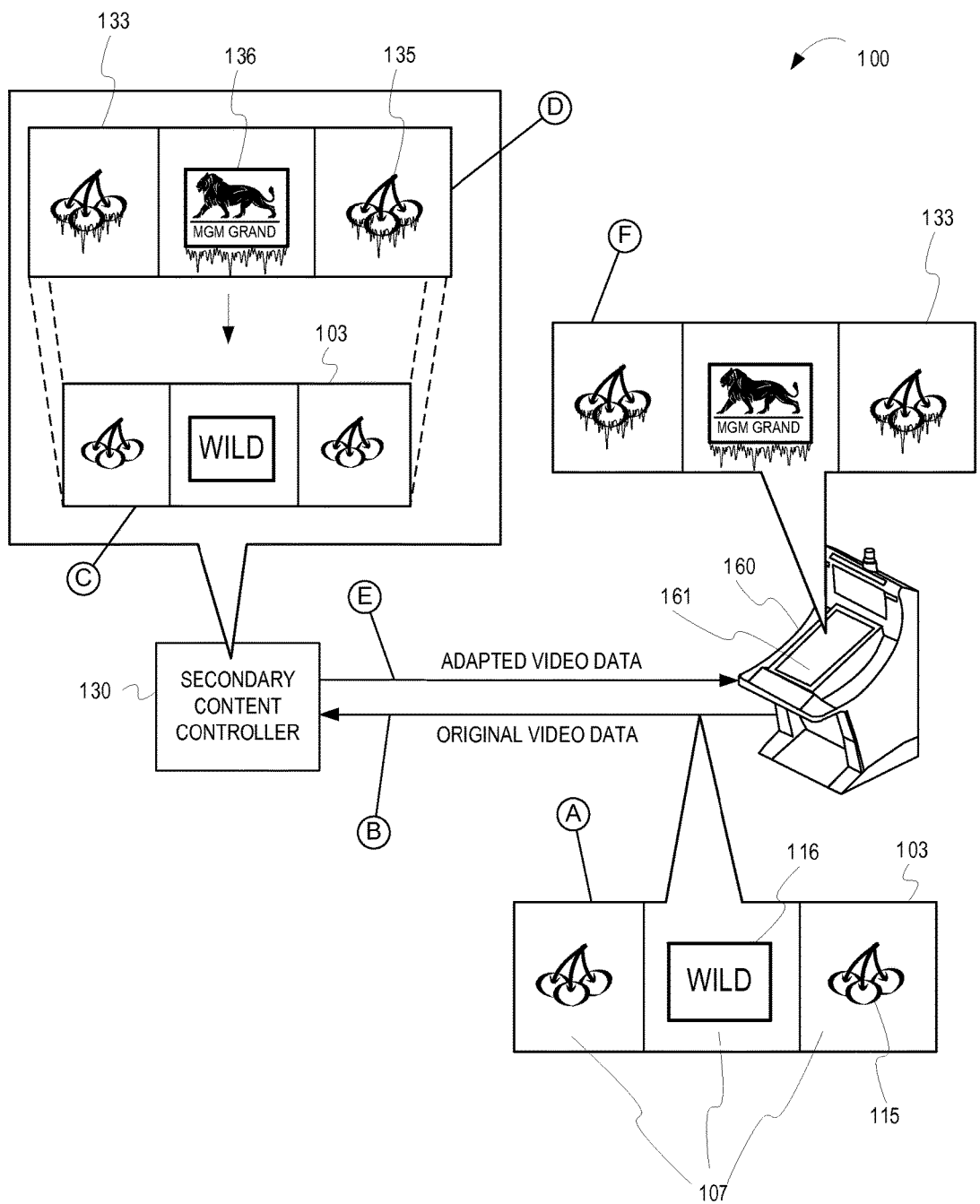
FIG. 1 is an illustration of altering the appearance of graphical content for a wagering game, according to some embodiments.

FIG. 1 is a conceptual diagram that illustrates an example of altering the appearance of graphical content for a wagering game, according to some embodiments. In FIG. 1, a wagering game system ("system") 100 includes a wagering game machine 160 that is configured to present wagering game content, such as a primary wagering game (also referred to as a "base" game). In the example shown in FIG. 1 (and in some other Figures referred to herein), the primary wagering game is a slot wagering game. However the same concepts disclosed herein would work for any other type of wagering game (e.g., video poker, video Bingo, video Keno, community wagering games, online wagering games, secondary wagering games, etc.), which may be presented on an electronic visual display device (e.g., a liquid crystal display, a light emitting diode display, etc.). The wagering game content associated with the primary wagering game will be referred to herein as "primary wagering game content." A primary content controller associated with the wagering game machine 160 is configured to provide instructions to a graphics controller of the wagering game machine 160 to generate video data. The video data depicts the primary wagering game content. The primary wagering game content includes graphical content with artwork that was specifically designed for the primary wagering game. Some examples include symbol 115 (depicted as a grouping of cherries) or symbol 116 (depicted as a "WILD" symbol). The symbol 115 and symbol 116 are members of a set of symbols for the primary wagering game. The set of symbols are used to specify game outcomes for any given game play round of the wagering game.

At stage "A," the content controller associated with the wagering game machine 160 generates a random game outcome for the primary wagering game. For example, the primary content controller can generate a random number in response to detecting that a player makes a wager and initiates a spin operation of slot reels 107 for the primary wagering game. Based on the random number, the wagering game selects a specific reel-stop position for each of the reels 107. Prior to revealing the specific reel-stop position, each of the slot reels 107 appears to spin independently during the spin operation and, eventually, stop in its specific reel-stop positions. When the reels 107 stop, their specific reel-stop positions will cause the symbols on the slot reels 107 to be arranged in specific symbol configurations, which are presented on at least a portion of the slot reels 107 visible to the player. Some of the specific symbol configurations appear in one or more paylines. The paylines are specific groupings of some of the symbols that appear on the slot reels 107, which groupings are eligible for a particular payout in the primary wagering game. If a symbol configuration that appears in one or more paylines matches a particular configuration indicated in the pay table, then the symbol configuration represents a winning outcome for the primary wagering game. The reward for the winning outcome is based on odds indicated in the pay table for the symbol configuration, an amount wagered in the wagering game, or other factors. In the example of FIG. 1, the pay table for the primary wagering game may specify that if three or more of the symbol 115 aligns in a payline configuration, then the primary wagering game will pay out a specific multiplier of a wager amount. The symbol 116, as a "WILD" symbol, can represent any of the symbols for the primary wagering game, including the symbol 115. Thus, the configuration of the symbols 115 and 116 shown in FIG. 1 would represent a winning outcome for the primary wagering game, Also at stage "A," the wagering game machine 160 generates rendered video (e.g., a first video frame 103) that shows the specific reel stop configuration for the reels 107. For example, the wagering game machine 160 renders the first video frame 103 after determining the specific reel-stop configuration mentioned in stage "A." For example, a graphics card of the wagering game machine 160 can render the first video frame 103.

At stage "B," a secondary content controller 130 (independent from the primary content controller of the wagering game machine) obtains the rendered video (e.g., intercepts the first video frame 103). For example, the secondary content controller 130 can be a separate hardware device incorporated into, or communicatively coupled with, the wagering game machine 160. For instance, the secondary content controller 130 may be incorporated into a device (e.g., a board) that can plug into a riser card expansion slot of a motherboard of the wagering game machine 160. The secondary content controller 130 can be configured to intercept native video data for the primary wagering game directly from a graphics card of the wagering game machine 160. The secondary content controller 130 prevents the first video frame 103 from being presented (via display device 161 of the wagering game machine 160) until the secondary content controller 130 can modify the graphical content that is depicted in the first video frame 103.

At stage "C," the secondary content controller 130 detects the appearance of images within the first video frame 103. For example, the secondary content controller 130 performs graphical analysis on the first video frame 103 to detect locations, shapes, textures, edges, shading, colors, text, etc. of the images on the first video frame 103. For instance, the secondary content controller 130 can detect a location of the reels 107, a location of symbol 115, and a location of symbol 116, relative to a frame boundary of the first video frame 103. Thus, the secondary content controller 130 can determine coordinates for any instance of symbol 115 and symbol 116 within the first video frame 103. Further, the secondary content controller 130 can determine the shapes for the symbols 115 and 116.

At stage "D," the secondary content controller 130 modifies (e.g., re-skins, overlays, replaces, etc.) some, or all, of the images of the first video frame 103. For example, the secondary content controller 130 generates new symbols 135 and 136. Symbol 135 has a general appearance of symbol 115. In some embodiments, the secondary content controller 130 may use the symbol 115 and modify the artwork. For example, the secondary content controller 130 adds (e.g. overlays) the appearance of icicles to the symbol 115, which results in a modified version of symbol 115 (i.e., symbol 135). The secondary content controller 130 can refer to various types of data to determine how to modify the artwork of the first video frame 103. For example, the secondary content controller 130 may refer to weather data, such as a current temperature, or a recent average of temperatures. If the temperatures are very cold, the secondary content controller 130 may determine to add the appearance of icicles to the first video frame 103 to indicate the temperature of the external environment. In other examples, the secondary content controller 130 detects game data and modifies graphical content accordingly. For example, the secondary content controller 130 detects that the primary wagering game has not resulted in a significant win for a given amount of time. Hence, the secondary content controller 130 may determine to add the icicles to the appearance of the graphical content of the first video frame 103 to indicate a degree of "coldness" of the hit rate for the wagering game machine 160. In other examples, the secondary content controller 130 detects casino data, such as an indication by a casino server that a casino-sponsored event is in effect. Consequently, the secondary content controller 130 may determine to replace one or more symbols with symbols that have casino branding and/or with symbols that have an appearance related to the casino-sponsored event. For example, symbol 136 specifies a logo for a specific casino.

Still referring to stage "D," the secondary content controller 130 can copy the contents of the first video frame 103 to generate a background layer for a second video frame 133. The secondary content controller 130 may then overlay some, or all, of the modified images (e.g., symbols 135 and 136) onto the second video frame 133. In some examples, the secondary content controller 130 alpha blends images of the symbols 135 and 136 into the second video frame 133.

At stage "E," the secondary content controller 130 renders the second video frame 133 and provides the second video frame 133 to the wagering game machine 130. Specifically, the secondary content controller 130 provides the second video frame 133 to the display 161.

At stage "F," the display 161 presents the second video frame 133. In some embodiments, the secondary content controller 130 is synched to a refresh rate for the display 161 and is configured to provide a stream of modified video frames to the display 161 based on video frames obtained for the primary wagering game content.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures and wagering game system architectures.

Wagering Game System Architecture

Figure 2:
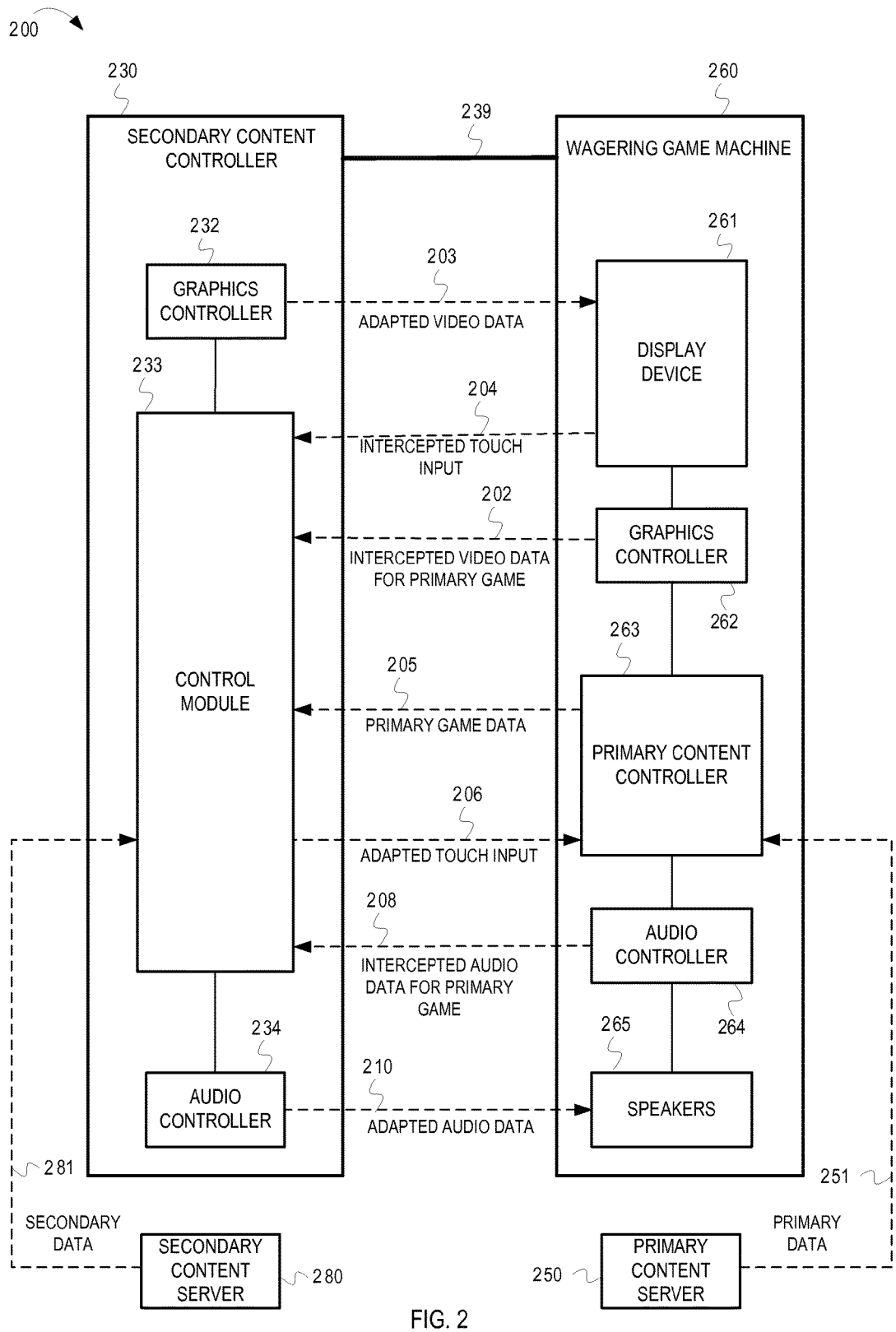
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 includes a wagering game machine 260 similar to the wagering game machine 160 described in FIG. 1. The wagering game machine 260 is configured to present and control wagering games as well as other content associated with the wagering games. The wagering game machine 260 includes one or more output related components and devices ("output components") configured to control and/or present output information related to the wagering games and the other content. For example, the wagering game machine 260 includes one or more display devices (e.g., display device 261) configured to present wagering game content for the wagering games, content for casino services, content for advertisements, and so forth. The output components further include video and graphics devices or engines (e.g., graphics controller 262) which generate a graphical depiction of content, such as for a primary wagering game. In another example, the output components include speakers 265, an audio controller 264, sound cards, etc. that generate and/or present sounds for the wagering games and other content. In another example, the output components include one or more payout mechanisms, such as printer that prints out tickets, coupons, etc. related to the wagering games. For example, the printer can print out a ticket that shows a cash-out amount for one or more wagering games concurrently presented via the wagering game machine 260. In yet another example, the output components include various lighting devices that show information related to wagering games, such as lighting effects (e.g., a celebratory effect, an attract effect, etc.).

The wagering game machine 260 also includes one or more input related components and devices ("input components") configured to control and/or provide input for the wagering games and other content presented via the wagering game machine 260. For example, the input components include a touch-screen display (e.g. incorporated into display device 261) by which a user can touch a screen and select certain virtual controls, objects, items, etc. presented on the touch-screen display. In another example, the input components include a button panel with buttons related to one or more wagering games, application, services, etc. presented via the wagering game machine 260. The buttons, for example, may indicate betting amounts, payline amounts, spin controls, or other items used to make bets, spin reels, etc. for a wagering game. The buttons may also detect input related to payout mechanisms and/or cashing out a wagering game, such as an activation of a cash-out button used to transfer credits from wagering game credit balances to a cash-out object, card, ticket, account, etc. The buttons may also accept input related to casino services and amenities. In some examples, the input components also include input devices related to funds, player information, etc. For example, the wagering game machine 260 may include an information reader that reads information from a card or device and connects to a player account, a customer loyalty account, a financial account, etc. In some examples, the information reader can communicate with a mobile device, such as a player's personal mobile device. In yet other examples, the input components include eye tracking equipment, biometric devices, and so forth.

The wagering game machine 260 also includes a primary content controller 263 configured to control content, such as a primary wagering game, provided from a primary source of wagering game content (e.g., from a memory store within the wagering game machine 260, from a primary content server 250, etc.). The primary content controller 263 can include software and hardware, such as a processor, memory devices, an operating system, game applications, etc. For example, the primary content server 250 can provide primary data 251 to the primary content controller 263, such as control and application data for one or more client applications controlled by the primary content controller 263. In some embodiments, the client application is a Rich Internet Application (RIA), such as an application that uses the Adobe® Flash® Platform, the Oracle® JavaFX® Platform, the Microsoft® Silverlight® Platform, etc. The client application can present wagering game content via the wagering game machine 260. In some embodiments, the primary content controller 263 is configured for a client-server architecture.

The wagering game system architecture 200 also includes a secondary content controller 230 configured to communicate with various components of the wagering game machine 260 to present and control various aspects of independent secondary content using the output components and the input components of the wagering game machine 260. In some examples, the secondary content controller 230 is similar to the secondary content controller 130 described in FIG. 1. For example, the secondary content controller 230 may be incorporated into the wagering game machine 260 (e.g., plugged into an expansion slot on a motherboard of the wagering game machine 260). In other embodiments, the secondary content controller 230 is external to the wagering game machine 260 and is connected to the wagering game machine 260 via a communications connection 239 (e.g., plugged into an Ethernet port of the wagering game machine 260, connected wirelessly to the wagering game machine 260, etc.).

The secondary content controller 230 includes a control module 233 configured to detect information from the various devices and components of the wagering game machine 260 including information from the output components and the input components. For example, the control module 233 detects graphics data 202 (e.g., graphical and video data) provided from a video card, a graphics engine, or other sources of graphics data of the wagering game machine 260 (e.g., from the graphics controller 262). In some embodiments, the graphics data 202 includes rendered video content, such as video frames that depict graphical images of the primary wagering game content. In some embodiments, the control module 233 is configured to graphically analyze the graphical images from the graphics data 202 and adapt and/or replace imagery, artwork, etc. In some embodiments, the graphics data 202 includes a position of primary wagering game content on a rendered video frame according to default display parameters (e.g., default size of a display area, default display dimensions, etc.). In some embodiments, the control module 233 is configured to manipulate the graphics data 202 to move or resize the position of the primary wagering game content relative to the default display parameters.

The control module 233 is further configured to send modified or adapted presentation data to a graphics controller 232, such as modified graphical analysis data, overlay graphics, background graphics, animations, display coordinates, display boundaries, display sizes, or other display data for the primary wagering game content that has been modified, overlaid, moved, resized, etc. The control module 232 is further configured to adapt the presentation of secondary content, such to modify artwork and/or images of secondary wagering games.

The control module 233 is further configured to receive secondary data 281 from a secondary content server 280. In some embodiments, the secondary data 281 includes secondary content, such as secondary content graphical images that can be used to replace and/or augment graphical images from primary wagering game content. Some examples of the secondary data 281 may include graphics, event data, casino data, game play data (e.g., game history, betting history, win data, loss data, persistent-state game data, progressive data, data about secondary wagering games, player data, environmental data, etc.). The control module 233 is configured to use the secondary content to adapt the presentation data for the primary wagering game. In other examples, the control module 233 provides adapted presentation data that identifies where to position a secondary wagering game relative to a position of the primary game content.

The graphics controller 232 is configured to receive the adapted presentation data from the control module 233 and generate modified output data to provide to the display device 261. In some embodiments, the modified output data includes adapted video data 203, such as a rendered version of the adapted presentation data from the control module 233. The adapted video data 203 may include a modified version of the primary wagering game content (e.g., primary wagering game content that has been replaced with secondary images, overlaid with secondary images, moved, resized, etc.). The graphics controller 232 is configured to render both the secondary game content and the primary game content so that the display device 261 can concurrently present both the primary game content and the secondary game content (e.g., side by side, overlaid, etc.).

In other words, in some embodiments, the secondary content controller 230 is configured to intercept native video content generated by the primary content controller 263 before the native video content can be presented on the display device 261. The secondary content controller 230 can modify the native video content for the primary wagering game so that it appears modified (e.g., smaller, moved, overlaid, replaced, etc.) on the display 261. The secondary content controller 230 can then cause the graphics controller 232 to render video for the primary game content and the secondary game content (e.g., for augmented or replaced imagery or artwork of the primary game content, for a secondary wagering game, etc.) and send it to the display 261.

Further, in some embodiments, the control module 233 is configured to intercept audio data 208 for the primary wagering game. For example, when the control module 233 intercepts the video data 202, the control module 233 intercepts any audio data that is associated with the video data 202. The control module 233 can modify the audio data to be consistent with the adapted video data 203, and provide adapted audio data 210 to the speakers 265. For example, the control module 233 can synchronize the audio data 208 with the video data 203. In another example, if the primary game content is modified with a new image that makes a new sound, the control module 233 can provide adapted audio data to the audio controller 234 to cause the speakers 265 to play the new sound when the accompanying image is presented via the display device 261.

Further, in some embodiments, the control module 233 is configured to intercept user input (e.g., touch input 204) from input components (e.g., from the display device 261) and provide the user input to the control module 233. The control module 233 is configured to receive the user input, interpret the user input, and, in some cases, modify the user input to correspond to adapted presentation data. The control module 233 is further configured to provide modified input data (e.g., adapted touch input 206) to the primary content controller 263. For instance, the control module 233 is configured to intercept raw touch-screen input from the display device 261 before the primary content controller 263 can detect the touch-screen input. The control module 233 converts or remaps the touch-screen input to different coordinates of the touch-screen display that relate to a modified location of primary content on the display device 261 as well as to secondary content presented on the display device 261. The control module 233 sends the modified input data 206 to the primary content controller 263 so that the primary content controller 263 can control the primary game according to the modified input data 206. For instance, control module 233 determines whether any touch data has been received in an area of the display device 261 associated with the primary wagering game content. When the control module 233 detects that touch data is associated with the primary wagering game content, the control module 233 interpolates the touch data associated with the modified presentation of the primary wagering game to a native format of the touch data expected by the primary content controller 263. In some embodiments, the interpolation is necessary because the primary content controller 263 is programmed to operate on the received touch data as if the primary wagering game content occupied an entire screen area of the display device 161 as opposed, in some embodiments, to a modified presentation of the primary wagering game content, caused by the secondary content controller 230.

Further, the control module 233 can detect input via the display device 261 for one or more aspects of a secondary wagering game, such as when a player touches one or more second virtual buttons (a bet control and a spin control to spin virtual reels for the secondary wagering game). The control module 233 is further configured to use the touch input that corresponds to the secondary game to control the secondary wagering game.

The control module 233 is further configured to detect primary game data 205 generated by the primary content controller 263. The control module 233 is further configured to use the primary game data 205 to determine how to modify primary game content, secondary content, etc. For example, the control module 233 can determine whether to replace and/or augment an image from the primary game content based on the primary game data 205. For instance, the control module 233 may detect that a symbol in a primary wagering game is used in a pay table to specify a certain wagering game outcome. The control module 233 can receive, via the primary game data 205, information about the symbol, information about when the symbol is used, information about the pay table, information about game outcome related to the symbol, etc. The control module 233 is further configured to generate updates to the adapted presentation data based on the primary game data 205.

The secondary content controller 230 may also include an accounting control module configured to receive, from the control module 233, user input that relates to financial transactions, such as credit transfers, cash outs, etc. For instance, the control module 233 is configured to detect that a cash-out button is selected at the wagering game machine 260 from a virtual button presented by the display device 261 or from a physical button on a control panel of the wagering game machine 260. The control module 233 is further configured to respond to the selection of the cash-out button with a series of operations that cause a credit-meter balance for a secondary wagering game to be combined with a credit-meter balance for the primary game.

The wagering game system architecture 200 can also include an account server configured to provide user information and store information related to a player account or a financial account associated with a player. In some embodiments, the secondary content controller 230 is configured to send a combined credit total to the account stored on the account server instead of cashing out the combined credit total to an output device of the wagering game machine 260. For example, instead of printing a ticket via a printer of the wagering game machine 260, or instead of writing a credit amount to a card via a magnetic card reader of the wagering game machine 260, the secondary content controller 230 may instead send adapted accounting data to the account server. The adapted accounting data may include information necessary to electronically transfer the amount of the combined credit total to the account associated with the account server.

In some embodiments, the secondary content controller 230 can function as a proxy, or spoof of an accounting host. In some embodiments, the secondary content controller 230 can function as a secondary account host in addition to a casino accounting host. The secondary content controller 230 can subscribe to accounting information related to the primary wagering game.

In some embodiments, the control module 233 is configured to receive (e.g., subscribe to, intercept, etc.) Slot Accounting System (SAS) messages provided from the output components and input components (e.g., from the display device 261, from the graphics controller 262, from the primary content controller 263, from the audio controller 264, etc.). In some embodiments, the control module 233 is configured to act as a proxy for the SAS messages (e.g., revise the SAS messages, resend the SAS messages, respond to the SAS messages, generate new SAS messages, etc.).

Each component in the wagering game system architecture 200 is shown as a separate and distinct element. Some elements may be connected via a communications network. In other examples, some, or all, of the components shown may all be contained in one device, or in different devices according to other configurations not shown in FIG. 2. For instance, the secondary content controller 230 may be incorporated into the wagering game machine 260. Furthermore, some functions performed by one component could be performed by other components. For example, the primary content server 250 can also be configured to perform functions of the wagering game machine 260, and other network elements and/or system devices. Furthermore, the wagering game system architecture 200 can be implemented as software, hardware, any combination thereof, or other forms of embodiments not listed. For example, any of the network components (e.g., the wagering game machines, servers, etc.) can include hardware and computer-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on computer-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
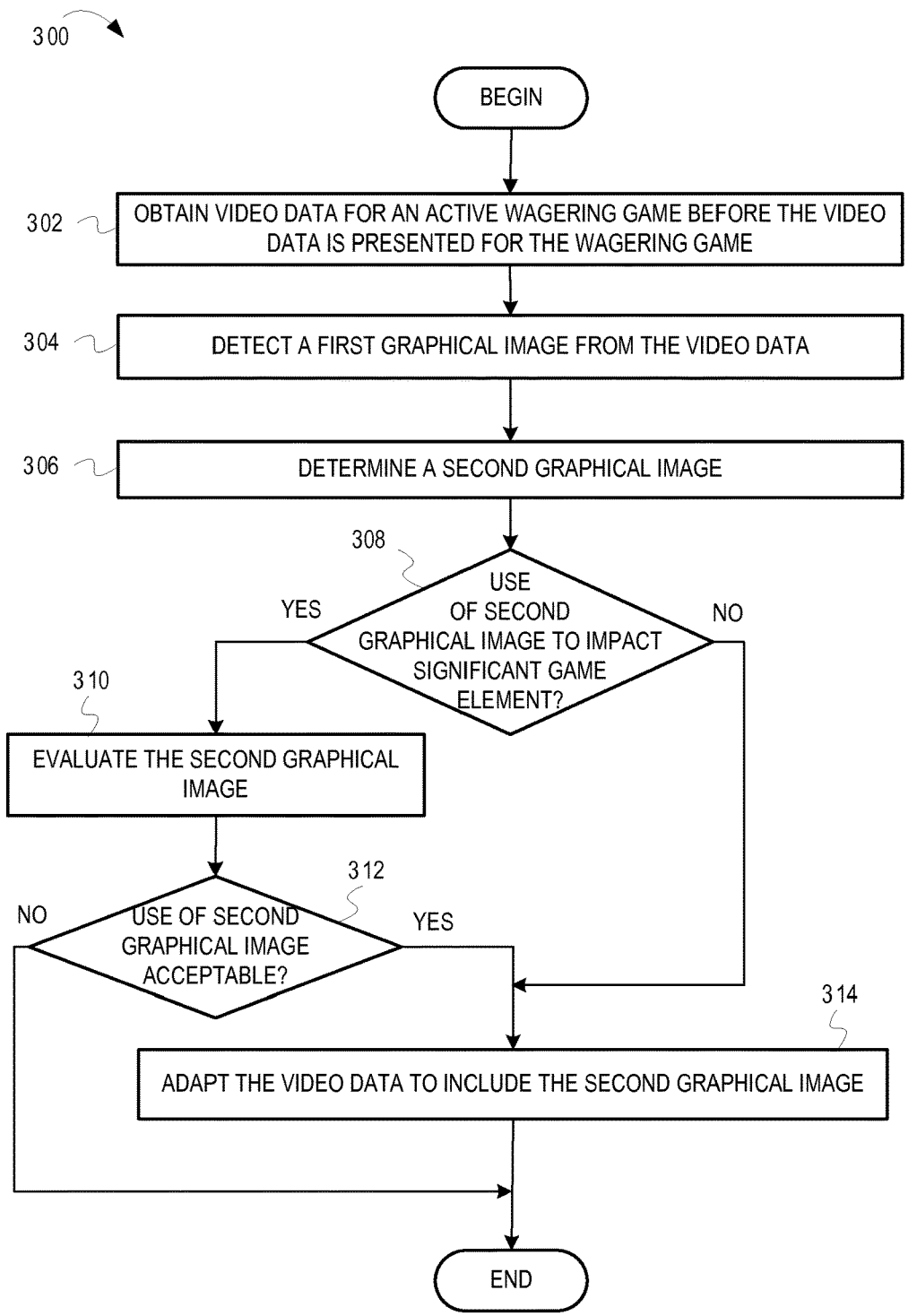
FIG. 3 is a flow diagram 300 illustrating adapting video data of a wagering game, according to some embodiments.

FIG. 3 is a flow diagram ("flow") 300 illustrating modifying graphics of a wagering game, according to some embodiments. FIGS. 4, 5, 6, 7, and 8 are conceptual diagrams that help illustrate the flow of FIG. 3, according to some embodiments. This description will present FIG. 3 in concert with FIGS. 4, 5, 6, 7, and 8.

Figure 4:
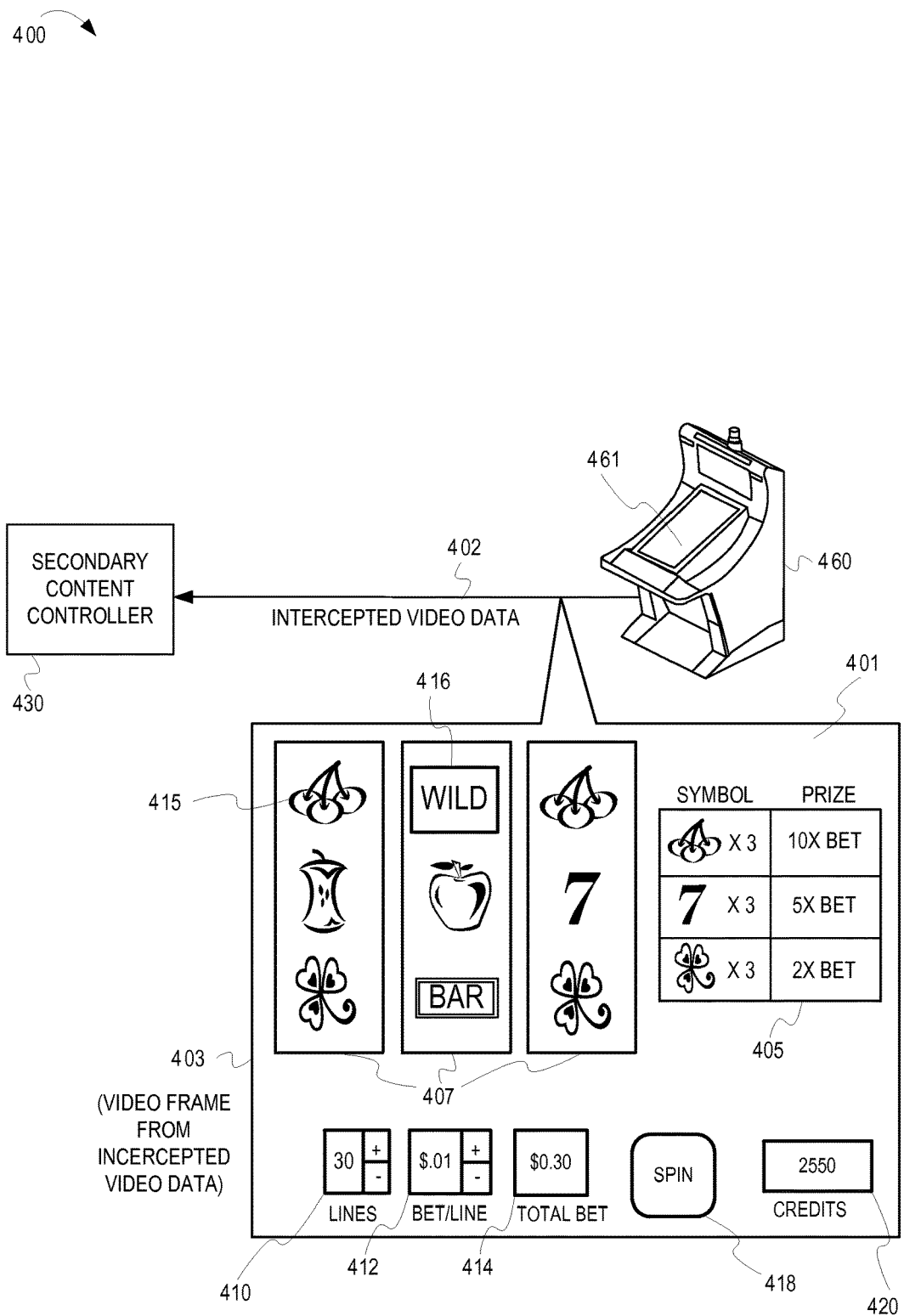

In FIG. 3, the flow 300 begins at processing block 302, where a wagering game system ("system") obtains video data for an active wagering game before the video data is presented for the wagering game. FIG. 4 illustrates an example. In FIG. 4, a wagering game system 400 includes a secondary content controller 430 and a wagering game machine 460. The secondary content controller 430 is independent from a primary wagering game controller associated with the wagering game machine 460. The wagering game machine 460 initiates a wagering game in response to player input. For example, the wagering game machine 460 detects when a player inserts a ticket into a ticket reader of the wagering game machine 460. The ticket is encoded with funds for a wagering game session. In other examples, the wagering game machine 460 detects when a player logs in to a player account via the wagering game machine 460. For example, the wagering game machine 460 includes a card reader that reads a player card for a player account (e.g., from an account based wagering system). In response to the player input, the wagering game machine 460 initiates a wagering game session, and activates a primary wagering game 401. For instance, the wagering game machine 460 may initiate presentation of credit values in a credit meter 420. Further, the wagering game machine 460 may control presentation of slot reels 407. The slot reels 407 present a depiction of symbols (e.g., distinct images on the reels 407 that indicate game play elements, such as symbol 415 and symbol 416). Further, the wagering game machine 460 controls presentation of a payline control 410 (to select a number of pay lines), a bet-per-payline control 412 (an amount to bet on each of the pay lines), a total bet meter 414 (the number of pay lines multiplied by the amount to bet on each of the paylines), or a spin control 418 (to spin the reels 407 for the primary wagering game 401).

In some examples, the secondary content controller 430 intercepts video data 402 for the primary wagering game 401 prior to presenting the video data 402 via a display device 461 of the wagering game machine 460. For instance, the secondary content controller 430 intercepts a stream of video frames (e.g., exemplified by a single video frame 403) from a video card of the wagering game machine 460. For example, the secondary content controller 430 can detect a signal from the video card of the wagering game machine 460 that includes the video frame 430. The secondary content controller 430 can prevent the signal from being provided to the display device 461, which prevents the video frame 403 from being presented via the display device 461. The secondary content controller 430 can be connected to a motherboard of the wagering game machine 460 (e.g., via an extension port). The secondary content controller 430 can be configured with circuitry, logic, programming, etc. that can detect video signals and decode the data. In some embodiments, the secondary content controller 430 can send a message to a video controller of the wagering game machine 460 to send the video data to the secondary content controller 430 and not to the display device 461.

The video frame 430 includes images of the symbol 415, the symbol 416, a pay table 405, the reels 407, the payline control 410, the bet-per-payline control 412, the total bet meter 414, the spin control 418, and any other images (not shown) that may be involved in presentation of a wagering game (e.g., a title graphic, background artwork, player profile data, etc.).

Referring momentarily back to FIG. 3, the flow 300 continues at processing block 304, where the system detects a first graphical image from the video data. In some embodiments, a secondary content controller can obtain descriptive data that describes characteristics of imagery in video data, including the first graphical image. For instance, the descriptive data can include markers, tags, indicators, property values, metadata, or other information that describes, or can be analyzed to ascertain, characteristics of the first graphical image. Examples of characteristics of an image may include, but are not limited to, a name, a color, a meaning, a value, a location, a shape, a relationship to other images, a relationship to a pay table, etc. The secondary content controller can obtain the descriptive data from a source external to, or separate from, the secondary content controller, such as a primary content controller, a wagering game server, a wagering game manufacturer, etc. For example, a wagering game manufacturer can provide data that describes symbols, and their order, on a virtual reel strip. In some embodiments, the secondary content controller can query the source for the descriptive data. The secondary content controller can then use the descriptive data to select the first graphical image in the video data.

Figure 5:
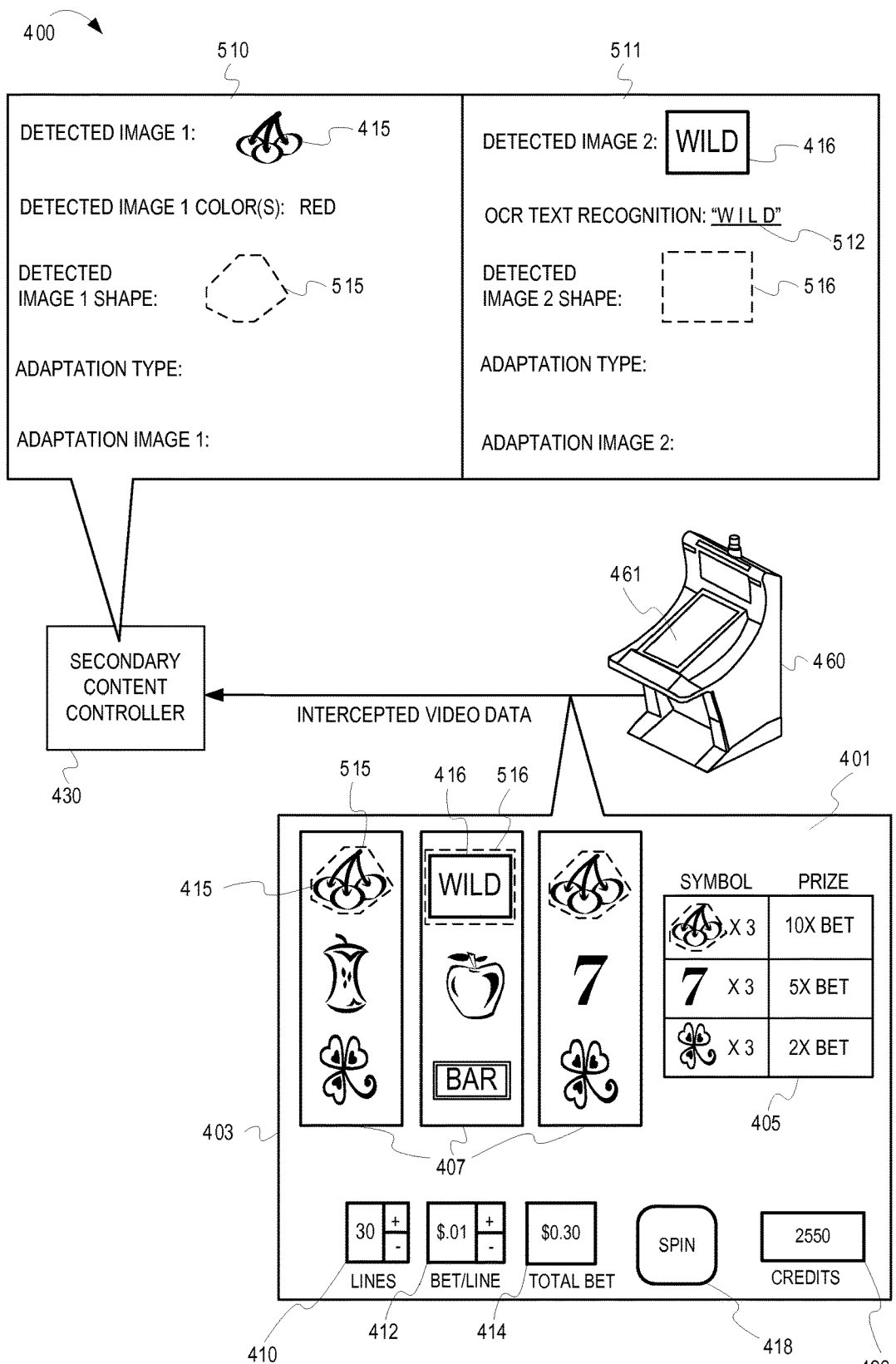

However, in other examples, a secondary content controller does not receive game data from another source, instead the secondary content controller analyzes the video data to determine characteristics of the images of the video content. For example, the secondary content controller can perform graphical analysis of intercepted video data. In some examples, the secondary content controller can perform graphical detection operations that recognize an appearance of a symbol in a video frame (e.g., digitally recognize, frame by frame, artwork on a video frame that is targeted for replacement). Thus, in some embodiments, the secondary content controller does not need to access built-in game markers of the primary wagering game. Therefore, in some embodiments, the primary wagering game and/or the primary content controller are entirely independent from the secondary content controller. Thus, in this example, only the secondary content controller is involved in detecting graphical imagery from the video data. The primary wagering game and the primary content controller are not involved in providing information that can be used to detect the graphical imagery (other than generating the video data which the secondary content controller intercepts). FIG. 5 illustrates an example of graphical analysis of primary wagering game content without participation from the primary wagering game or the primary content controller.

In FIG. 5, the secondary content controller 430 (described in FIG. 4) digitally detects, from the video frame 403, a shape 515 of the symbol 415 as well as a shape 516 of the symbol 416 from the video frame 403. For example, the secondary content controller 430 performs a graphical analysis by video, graphical-analysis algorithms. The algorithms can analyze a video signal generated from a graphics controller of the wagering game machine 460. For instance, the secondary content controller 460 may include a field-programmable gate array (FPGA) which is specifically programmed with the graphical analysis logic. In one example, the secondary content controller 460 is configured to receive a video output of a video card of the wagering game machine 460 and provide a video input to the display device 461. The FPGA is synced to the refresh rate of the display device 461. The secondary content controller 430 takes each frame rendered by the video card of the wagering game machine 460. For each frame, the secondary content controller 430 can perform the graphical analysis of the content in the frame, such as for video frame 403.

In some examples, the secondary content controller 430 tracks information related to the detected images. For example, the secondary content controller 430 stores, in a first record 510, a copy of the symbol 415, an indicator of the shape 515, and other visually detectable information (e.g., colors, shades, shapes, sizes, etc.) which can distinguish the detected image from other detected images. In a second record 511, the secondary content controller 430 stores a copy of the symbol 416, an indicator of the shape 516, and other descriptive information, such as optically recognized text 512 (i.e., the text string "WILD"). Optical recognition of the text distinguishes the image 416 from other images of the frame 430 that may have a similar shape as shape 516.

Referring momentarily back to FIG. 3, the flow 300 continues at processing block 306, where the system determines a second graphical image. In some embodiments, the system determines a second graphical image to use to replace and/or augment the first graphical image. In some embodiments, the system can select the second graphical image from secondary content. In some examples, the system can determine the second graphical image based on one or more factors. For example, the system can select the second graphical image based on, but not limited to, one or more of the following factors:

- wagering game data (e.g., hit rates, win streaks, big wins, jackpots, game accomplishments, etc.);
- environmental data (e.g., weather, degree of light, humidity, temperature, population density of casino patrons, sounds and visual effects from nearby wagering games, etc.);
- casino preferences and events (e.g., casino sponsored events, tournaments, maintenance events, patron tracking events, security events, etc.);
- casino business needs (e.g., advertising needs, show ticket sale needs, drink sale quotas, etc.);
- graphical modification rules (e.g., rules that indicate when graphics can be replaced or augmented, rules that indicate which graphics should be modified for a given situation, etc.);
- jurisdictional rules (e.g., rules that indicate what imagery may be considered offensive in a given region, rules that indicate whether outcome-dependent images can be modified, etc.);
- time of day;
- date;
- player data (e.g., player profile data, account balances, loyalty status, betting average, game-play rate, social network activity, accomplishments of friends in wagering games, player preference for a particular type of game theme, player calendar data, etc.);
- subscription data (e.g., whether a casino has subscribed to a graphics modification service from a manufacturer); and secondary game data (e.g., a degree of play of a secondary wagering game, accomplishments of a secondary game, progress in a persistent-state game, etc.).

In some embodiments, the system can determine one or more additional graphical images (e.g., a single graphical image, a set of replacement symbols, etc.) based on the factors. For example, at the run-time of a primary wagering game, the system can analyze a player status level (e.g., detect that the player has a high loyalty status), a player calendar (e.g., detect that the player is celebrating her anniversary), and a casino need (e.g., a casino need to market a type of show that has lagging ticket sales). Then, based on the analysis, the system can select a set of symbols for the wagering game that best addresses all of the factors. For example, the system can provide 3-D images based on the high loyalty status of the player. In another example, the system can provide symbols that have some wedding or celebratory theme based on the player celebrating her anniversary. In another example, the system can provide symbols that highlight a performer at a casino show based on a business need to sell tickets for the show.

In some examples, the system can provide symbols that are 3D-stylized art (e.g., two-dimensional artwork that appears three-dimensional based on use of shading, perspective, etc. in the two-dimensional image). In other examples, however, the system can provide stereoscopic type 3-D art. For example, the system can interleave different views of the image in different columns of a stereoscopic/autostereoscopic display. In other words, the system can replace (e.g., substitute, overlay, etc.) one or more 2D images of the primary wagering game with stereoscopic 3D art and effects. In some examples, the system can analyze the one or more 2D images from an original video frame and using a 2D to stereoscopic 3D conversion chip, replace the 2D image with the stereoscopic 3D image.

Figure 6:
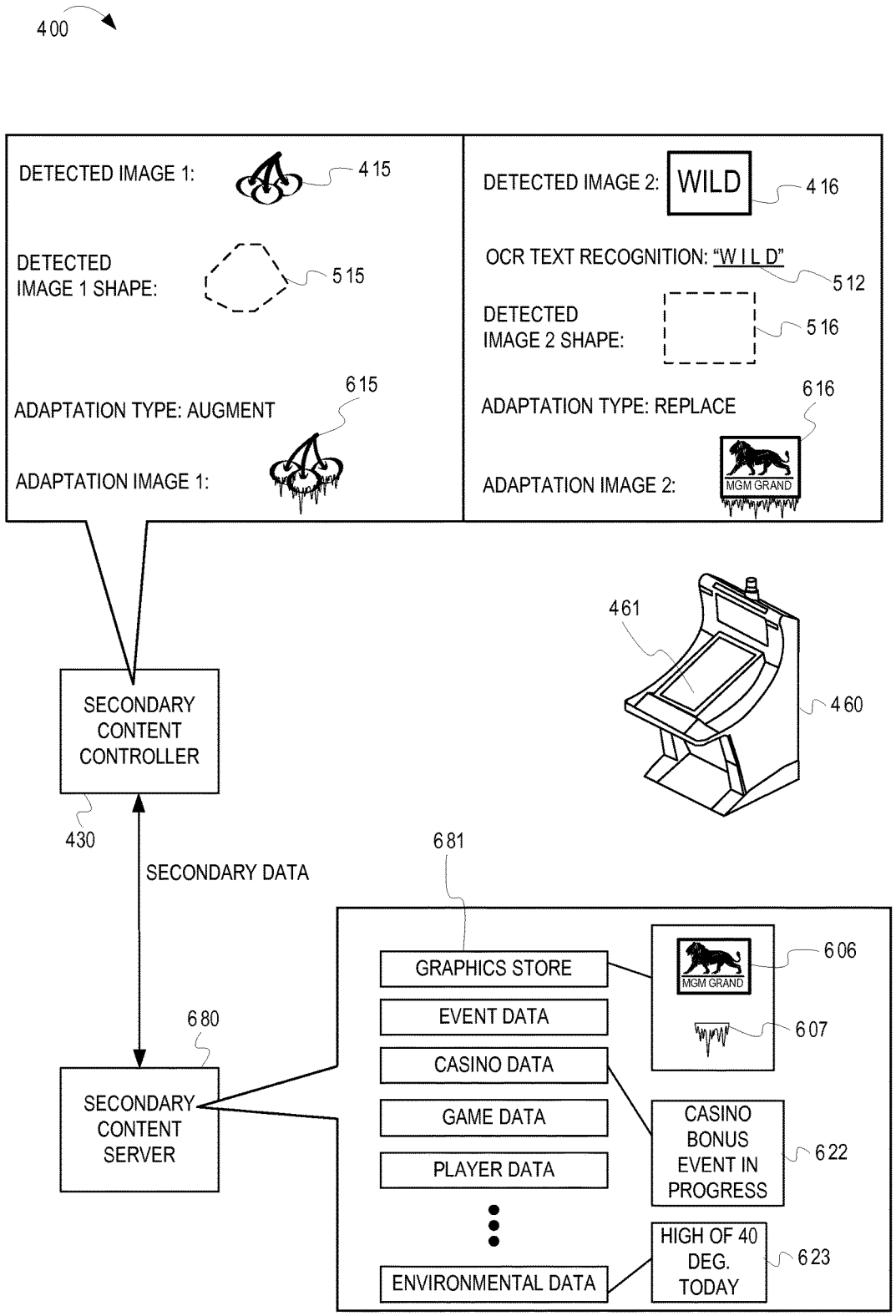

FIG. 6 illustrates an example of determining secondary images based on specific factors. For example, in FIG. 6, the secondary content controller 430 communicates with a secondary content server 680. The secondary content server 680 has access to various types of data, such as event data, casino data, game data, player data, environmental data, and so forth. The secondary content server 680 also includes a graphics store 681 with various graphical images that can be used to modify graphical content of a wagering game. For example, the graphics store 681 includes image 606 of a logo for a casino. The graphics store 681 also includes an image 607 of icicles. The secondary content controller 430 queries the secondary content server 680 for one or more of the various types of data. The secondary content controller 430 performs an analysis of the various types of data and, based on the analysis, selects the image 606 and the image 607. For example, the secondary content controller 430 detects data 622 that indicates that a casino bonus event is in progress. For example, the bonus event can be sponsored by the casino. The bonus event specifies that if a casino logo appears in a wagering game win, then the casino would provide a prize (e.g., a free spin, an entry into a tournament, status points, a cash prize, a coupon, etc.). Based on the data 622, the secondary content controller 430 selects the image 606. In another example, the secondary content controller 430 detects data 623 that indicates a temperature of an environment outside a casino. Based on the data 623, the secondary content controller 430 selects the image 607 of the icicles.

Furthermore, the secondary content controller 430 generates adapted images to incorporate into the primary wagering game content. For example, the secondary content controller 430 incorporates the image 607 into the copy of the symbol 415 to generate the image 615. Further, the secondary content controller 430 incorporates the image 607 into a copy of the image 606 to generate the image 616.

Referring momentarily back to FIG. 3, the flow 300 continues at processing block 308, where the system determines whether use of the second graphical image will affect a significant game element. For example, the system determines whether the second graphical image will replace the first graphical image. If the first graphical image is a significant gaming element (e.g., a graphic related to an outcome of the wagering game or a graphic related to a financial status of a wagering game), then replacement of the first graphical image with the second graphical image can have an impact on an important element of the wagering game. The replacement of the first graphical image with the second graphical image could potentially cause confusion to a player or may potentially interfere with jurisdictional requirements regarding clarity of presentation of game outcomes. For example, the first graphical image may be a symbol on reels. Symbols on the reels reveal an outcome for a wagering game. Therefore, replacement of a symbol could affect the presentation of a game outcome. Thus, if the second graphical image will replace the first graphical image, the system needs to verify that the replacement artwork of the second graphical image will not detrimentally affect the appearance of the significant gaming element. For instance, the system would need to determine verify that the second graphical image would not interfere with a reveal of a game outcome of the primary wagering game in a way that would appear to change the game outcome or cause confusion regarding the game outcome.

If at processing block 308, the system determines that the second graphical image will not affect a significant game element, the flow 300 continues at processing block 314, which will be described later. If, however, at processing block 308 the system determines that the second graphical image will impact the significant game element, the flow 300 continues at processing block 310 where the system evaluates the second graphical image to determine whether use of the second graphical image is acceptable (e.g., would not detrimentally impact appearance of the significant gaming element). For instance, the system can evaluate the second graphical image against the first graphical image, against game data, against jurisdictional rules, etc. For example, if the system determines that two different symbols are going to be replaced (e.g., a cherry image and a "bar" symbol, which are distinctly different images used to indicate a specific outcome in a wagering game), then the system would need to verify that the replacement artwork for the two symbols are also distinctly different, thus preventing a potential cause of confusion in the reveal of a game outcome. In another example, the system may also need to verify that replacement of symbols is done consistently. For example, the system may determine to replace a first cherry graphic with a second cherry graphic that is slightly different from the first cherry graphic. However, the system does not want to indicate that the first cherry symbol is being replaced in a pay table. Therefore, the system must verify that the second cherry graphic is clearly recognizable as being significantly similar to the first cherry graphic. For instance, the system may determine that the second cherry graphic is a reverse image or 3D image of the first cherry graphic. Thus, the system analyzes the shape, color, etc., of the second cherry graphic and determines that the second cherry graphic has a certain number of visual characteristics in common with the first cherry graphic such that the second cherry graphic would be distinctly recognizable as a version of the first cherry graphic. For example, the system could determine to replace a first cherry symbol on a symbol array with a first replacement cherry symbol that combines the original cherry symbol with a "+1 point" graphic. Simultaneously, for the same spin, the system could replace a second cherry symbol on the symbol array with a second replacement cherry symbol that shows the original cherry symbol combined with a "+1 free spin" graphic. The first replacement cherry symbol would not look identical to the second replacement cherry symbol. However, because both the first replacement cherry symbol and the second replacement cherry symbol both include a copy of the original cherry symbol, then they both look sufficiently similar to the original cherry symbol that they could both be identified as the same outcome determinant symbol of the primary wagering game. Therefore, the primary wagering game can still indicate a specific game outcome that uses the cherry symbol, because both replacement graphics replace the outcome-dependent symbol in a way that identifies the replacement graphics as being sufficiently similar in appearance that they do not cause confusion when a game outcome is presented (i.e., they are both substantially similar to the original cherry graphic indicated in a pay table).

Figure 7:
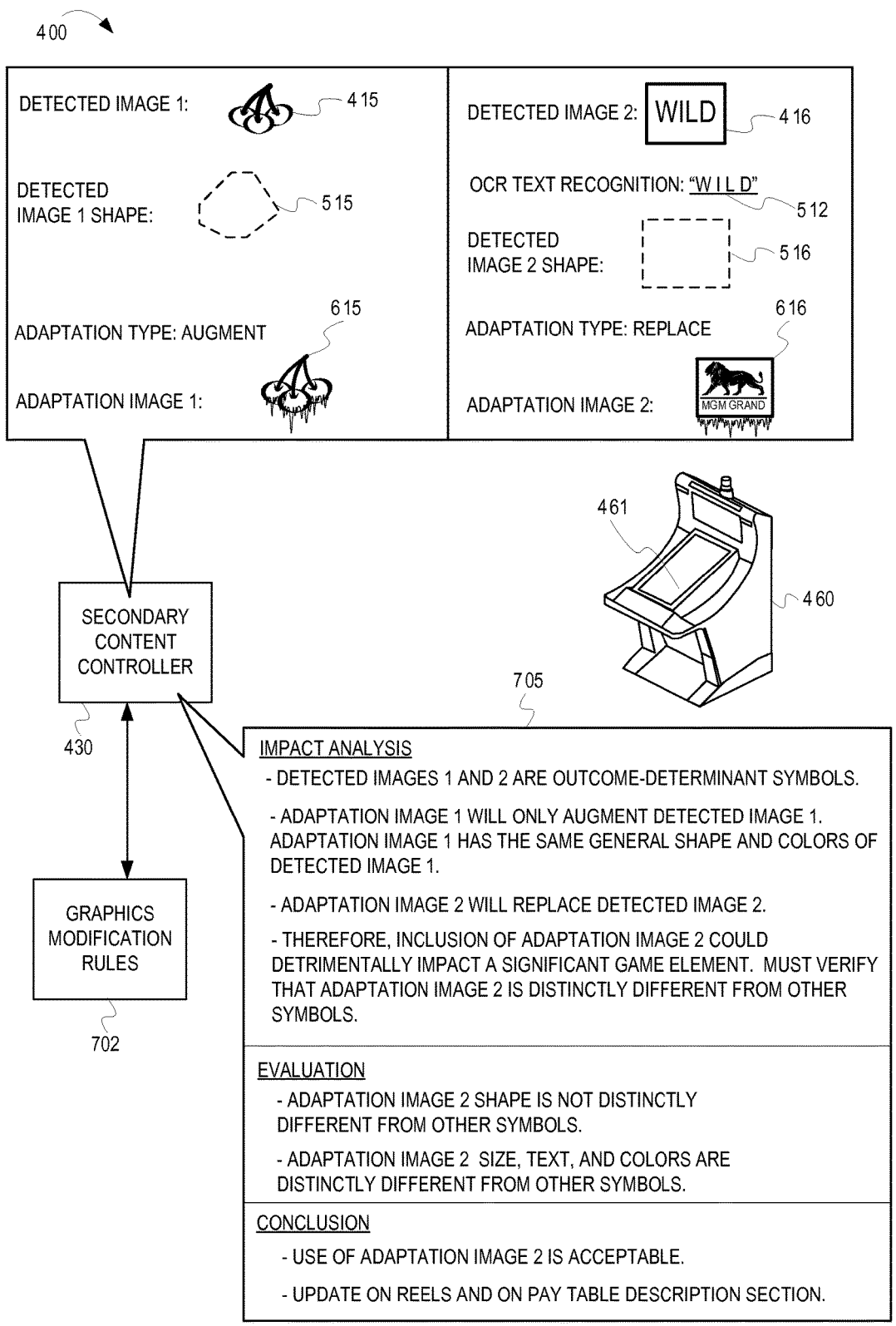

In FIG. 7, the secondary content controller 430 performs an analysis of the image 615 and image 616, using graphics modification rules 702, to determine whether the image 615 and the image 616 should be used. First, the secondary content controller 430 performs an impact analysis of the use of image 615 and image 616. For example, the secondary content controller 430 detects that symbols 415 and 416 are both outcome-determinant symbols (e.g., slot reel symbols). The secondary content controller 430 also determines that symbol 415 will only be augmented, not replaced (e.g., the image 615 still has the same general shape and colors of symbol 415). However, the secondary content controller 430 determines that symbol 416 will be replaced. As a conclusion to the impact analysis, the secondary content controller 430 determines that the image 616 must be evaluated.

Second, the secondary content controller 430 performs an evaluation of the image 616. For example, the secondary content controller 430 evaluates the shape of the image 616 against the shape of all images in the video frame 403 other than the symbol 416 that it will replace. Based on the analysis, the secondary content controller 430 determines that the image 616 does not have a shape that is distinctly different from the other images. For example, the image 616 has a shape that is substantially similar to another symbol (e.g., a "BAR" symbol which has a rectangular shape). Also, the image 616 has a shape that is substantially similar to various control graphics. Therefore, the secondary content controller 430 performs additional evaluation of other visual characteristics of the image 616 and determines that the colors, text and size of the image 616 are distinctly different from the other images, especially from other outcome-determinant symbols.

Finally, based on the evaluation, the secondary content controller 430 concludes that the replacement of the symbol 416 with the image 616 is possible without detrimentally affecting the appearance of a game outcome.

Referring momentarily back to FIG. 3, the flow 300 continues at processing block 312, where the system determines, based on the evaluation of processing block 310, whether the use of the second graphical image is acceptable. If the system determines that the use of the second graphical image is not acceptable, the flow 300 ends. If, however, at processing block 312, the system determines that the use of the second graphical image is acceptable, then the flow 300 continues at processing block 314 where the system adapts the video data to include the second graphical image. In some embodiments, the system adapts the video data to include the second graphical image. In some embodiments, the system adapts the video data without having to recompile the primary wagering game and without having to modify any programming from the primary wagering game. For example, in some embodiments, a secondary content controller, which is independent from a primary content controller for the primary wagering game, overlays content onto the video output of the primary wagering game content. The secondary content controller does not have to access graphical markers provided by the primary wagering game for the purposes of graphics replacement. Instead, the secondary content controller performs independent graphical replacement of the primary wagering game content without involvement by the primary wagering game.

In some embodiments, the system can overlay the second graphical image on top of the first graphical image. In some embodiments, the system can overlay the second graphical image over the first graphical image in a way that completely obscures the first graphical image. In other instances, the system can overlay the second graphical image over the first graphical image in a way that only partially obscures the first graphical image. For example, the system can overlay a semi-transparent image over the first graphical image. In another example, the system can overlay the second graphical image over only a portion of the first graphical image. For instance, the system can apply a seasonal, snow post-processing filter that would detect contours on images, and layer white edges along the top edges of the existing art.

Figure 8:
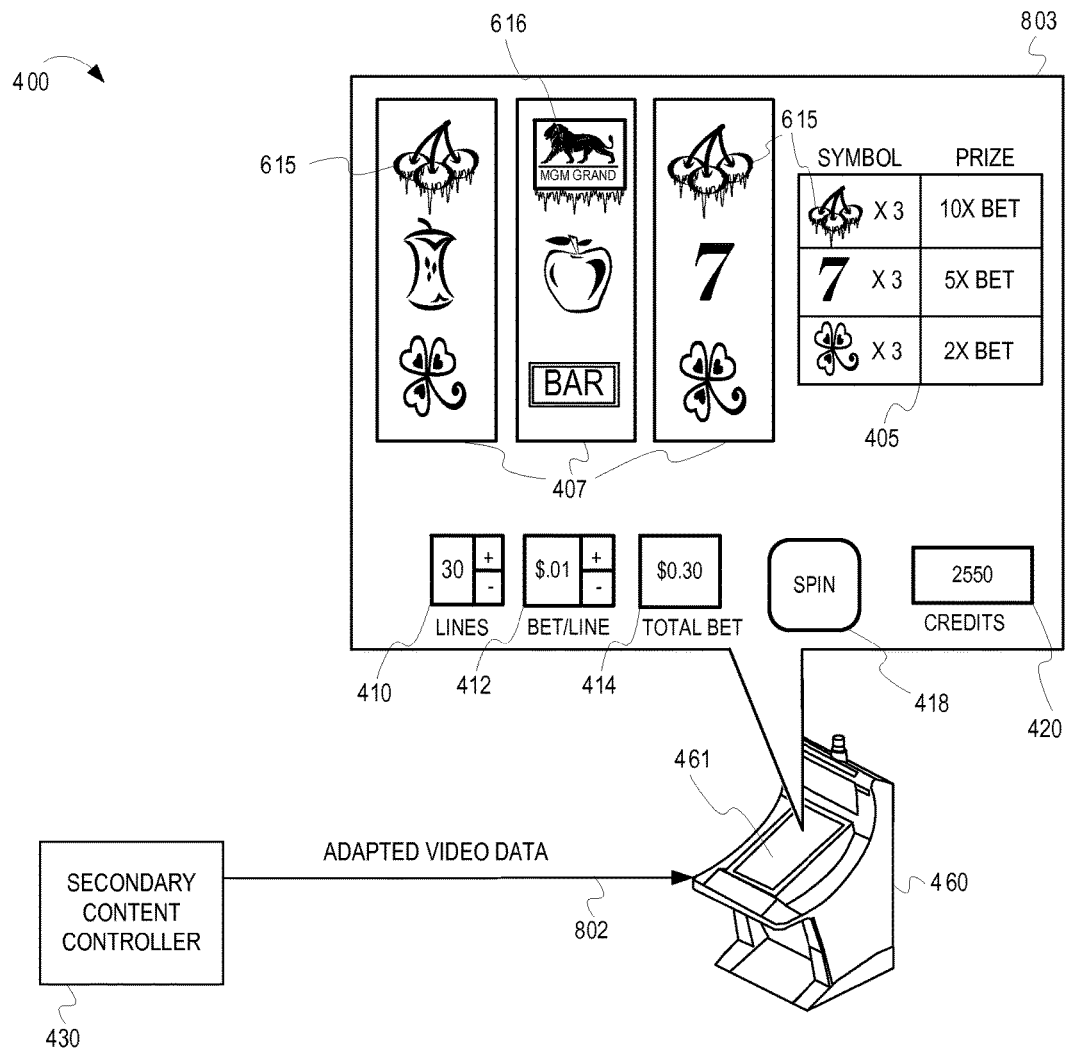

FIG. 8 illustrates an example of including secondary images. For example, the secondary content controller 430 can generate a replacement video frame 803 that is a modification of the original video frame 403. The secondary content controller 430 can provide adapted video data 802, which includes the video frame 803, for presentation via the display device 461. The video frame 803 includes the images 615 and 616, which have been incorporated in a way that replaces and/or augments the respective symbols 415 and 416. In some embodiments, the secondary content controller 430 can incorporate the images 615 and 616 by alpha blending the images 615 and 616 into the video frame 803. In other examples, the secondary content controller 430 can incorporate the images 615 and 616 by a cut and replace operation. In other examples, the secondary content controller 430 can incorporate the new images by rotating, distorting, skewing, reorienting, or otherwise modifying existing content from the video frame 403. In some embodiments, the secondary content controller 430 also replaces images of symbols in a pay table 405 or in other locations of the video frame 803 that include descriptive instances of the symbol (e.g., in help screens, in game animations, in congratulatory effects, etc.).

In some embodiments, the video frame 803 is the same general size and shape of the video frame 403. For example, a screen area of the video frame 803 is the same as a screen area of the video frame 403. A general location of the reels 407 has not changed, neither has the location of the pay table 405, the payline control 410, the bet-per-payline control 412, the total bet meter 414, the spin control 418, or the credit meter 420. However, a portion of the primary wagering game content on the reels 407 has been modified so that secondary content appears, within the context of the screen area of the frame 803, with the same relative location as the portion of the primary wagering game content did in the context of the screen area of the video frame 403. Specifically, symbols 415 and 416 were replaced and/or augmented with images 615 and 616 in a way that covers up some, or all, of the symbols 415 and 416, but does not necessarily cover up, or modify in any way, any of the other primary game content for the primary wagering game 401. Further, the images 615 and 616 appear to be part of the primary wagering game 401. Thus, the system 400 creates an integrated presentation that appears as if the secondary content (i.e., the images 615 and 616) were originally generated by a primary content controller for inclusion in the primary wagering game 401, even though the secondary content was generated, and included, by the secondary content controller 430.

Referring again to FIG. 3, in some embodiments, the system can introduce a delay to presentation of the primary wagering game to ensure sufficient time to perform the operations associated with processing blocks of flow 300. For example, the system can cause spinning of reels to repeat (e.g., introduces a repeat of video frame sequences of the spinning reels) to have enough time to perform evaluation and verification of the use of the second graphical image associated with processing blocks 308, 310, and 312 or to perform seamless adaptation of the video data associated with processing block 314. In some examples, the system can delay action in the primary wagering game, such as by freezing the usage of a spin control, by presenting an advertisement, by presenting bonus content, etc.

Additional Example Embodiments

According to some embodiments, a wagering game system ("system") can provide various example devices, operations, etc., to modify wagering game graphics. The following non-exhaustive list enumerates some possible embodiments.

Swapping Wagering Game Graphics Using Unique Visual Placeholders.

In some examples, the set of symbols for a primary wagering game can be a set of distinctly different placeholder images included with the primary wagering game by the game manufacturer. For instance, the set of placeholder images may be images that are easily identifiable from each other by a machine-recognition algorithm. For instance, the placeholder images may be a set of QR codes, a set of barcodes, a set of distinctly separate colors (e.g., primary colors, contrasting colors), a set of images with distinctly different gradient patterns, a set of images with textual identifiers, etc. For example, on video reel strips, for each position on the reel where a distinct reel symbol should be presented, the primary wagering game may instead present a separate QR code (e.g., QR code 1, QR code 2, . . . QR code N; for an N sized set of symbols). The system dynamically detects the placeholder images before they are presented via a display and replaces them with a set of corresponding images from one or more template sets of images. FIG. 9 illustrates one example.

In FIG. 9, a wagering game machine 960 provides a wagering game 901. The wagering game 901 includes reels 907 with a set of QR codes. Each of the QR codes represents a different element of the wagering game 901, such as slot reel symbols and pay table graphics. The wagering game 901 also includes a representation of a pay table 905 with some of the QR codes. The wagering game machine 960 renders a video frame 903 of the wagering game 901. The video frame 903 depicts some of the QR codes, such as QR code 915 and QR code 916. The secondary content controller 930 performs a graphical analysis of the video frame 903. Based on the graphical analysis, the secondary content controller 930 identifies each of the QR codes that are presented on the video frame 903. The secondary content controller 930 accesses game data 950 that specifies a listing of the QR codes and their specific meanings. For example, the QR codes may be ranked according to their relative values within a pay scale for the pay table 905. The secondary content controller 930 then selects a template set 919. The template set 919 may be one of a variety of template sets provided by the casino, a wagering game manufacturer, a secondary content provider, etc. Depending on the game data 950, the secondary content controller 930 selects the template set 919 and causes the QR codes in the reels 907 and the pay table 905 to correspond to certain images within the template set. For instance, the secondary content controller 930 can create a one-to-one correlation of individual QR codes to individual images in the template set 919. In some embodiments, the template set 919 is separated into different sections or categories, such as game symbol artwork, game control artwork, game data tags, advertisements, etc. For example, an image 923, associated with a credit meter 920, has a specific pattern that indicates where credit data should be depicted in the game. The secondary content controller 930 can correlate the pattern of the image 923 to a tag 924. The tag 924 includes an instruction to access and display credit data in place of the image 923. In some embodiments, the secondary content controller 930 may access more than one template set (e.g., a "game artwork" template set provided by a game manufacturer, a "marketing artwork" template set provided by a casino, a "game financials" template set, etc.). In one example, the secondary content controller 930 can correlate images in the template set 919 to QR codes according to value indicators stored in the template set 919 and in the gaming data 950. For example, in the gaming data 950 the QR code 915 has a value 971 that indicates that it represents a symbol with the highest relevance in the pay table 905. The secondary content controller 930 correlates the value 971 with a value 928 in the template set that is assigned to image 925. In a similar fashion, the secondary content controller 930 correlates a value 972, for the QR code 916, to a value 929 associated with the image 926, and so forth, correlating visual placeholder images that are detected from the video frame 903 to corresponding images, tags, etc. in the template set.

In some embodiments, the secondary content controller 930 selects template sets, replacement symbols, etc. based on contextual analysis. For example, the secondary content controller 930 can detect a subscription by a casino to a given game manufacturer's template sets. Based on the subscription (or varying subscriptions levels), the secondary content controller 930 can select certain template sets (e.g., subscription level 1 provides standard artwork, subscription level 2 further provides some 3D artwork for big win events, subscription level 3 further provides casino artwork insertion, etc.). In other examples, the secondary content controller 930 may select template sets based on one or more factors, such as specific network data (e.g., time, date, calendar events, system notifications, etc.), seasonal data, casino event data, game upgrade data, the factors specified for processing block 306 in FIG. 3, etc.

Further, after the secondary content controller 930 correlates the placeholder images detected in the video frame 903 to the images, tags, etc. in the template set 919, the secondary content controller 930 generates a video frame 953. The secondary content controller 930 includes non-placeholder images from the video frame 903 into the video frame 953. For instance, the secondary content controller 930 makes a copy of the video frame 903. The secondary content controller 930 then causes images from the template set 919 to replace the placeholder images, such as by overlaying image 925 over the QR code 915, overlaying the image 926 over the QR code 916, and overlaying any other of the detected placeholder images with corresponding values from the template set 919. In some embodiments, the secondary content controller 930 causes images of alphanumeric values to appear in place of placeholder images. For example, the secondary content controller 930 accesses the gaming data 950 to determine a given credit value for the gaming session (e.g., the "2550" credit value). The secondary content controller 930 then generates an image 963 of the credit value and positions it over the image 923.

Providing Wagering Game Graphics Based on Play-Related Data.

In some examples, the system can analyze play-related data (e.g. for the primary wagering game and/or for one or more secondary games). Based on the analysis the system can provide wagering game graphics. The system can analyze play-related data in various ways. For instance, the system can monitor all wagers and win activity on a wagering game machine. In another example, the system can determine performance of the primary wagering game over time. In another example, the system can access data related to a back-end protocol or player account data. In another example, the system can access server-based game data. In another example, the system can access data captured by a player's device (e.g., images taken from a player's mobile device of primary wagering game images).

The following are some examples of providing wagering game graphics in a wagering game based on analysis of play-related data.

- In some embodiments, the system draws a frame on top of or around a primary wagering game. The frame changes color or artwork to indicate when a machine "heats up" (e.g., when a winning percentage for the wagering game increases). For example, in FIG. 9, the secondary content controller 930 overlays flame images 985 around the reels 907.
- In some embodiments, the system generates a graph or indicator of a hit frequency for a wagering game machine (e.g., image 986 in FIG. 9), or a graph of a moving average payout over time for the wagering game machine. The system can then display the graph along an edge of a display screen for the wagering game machine.
- In some embodiments, the system can generate an image of a badge for one or more accomplishments that occur in a game or for a series of games played over time. The system can then overlay the badge on portion of a display screen of a wagering game machine. In some examples, the badge can indicate a highest payout the wagering game has made recently (e.g., image 987 shown in FIG. 9). In some examples, the badge indicates a number of spins since a last big payout
- In some embodiments, the system can generate and present a badge that is based on player specific, or session specific, accomplishments (e.g., a badge for a certain win level that occurred in a session, a number of games played in a session, etc.).
- In some embodiments, the system can detect and track an amount of credits spent and won in a wagering game (e.g., see image 963 in FIG. 9).

In some embodiments, the system determines that a player has attained a game accomplishment. The system can present a QR code, which the player can take a picture of using a camera of a smart phone. The smart phone can upload the QR code to a website, such as Facebook. A gaming server, associated with the website, can then detect the uploaded image of the QR code. The system can then replace the QR code with artwork for a badge. The badge can be presented on a webpage of the website. The gaming server does not necessarily need to ascertain an identity of the player, nor does the gaming server need to ascertain any specific player data. In some examples, the QR code can include a web address (e.g., a universal resource locator) that will launch a specific website that has a graphic of a badge when the smart phone takes a picture of the QR code.

In some examples, the system can analyze play-related data of a primary wagering game and, based on the analysis, the system can provide secondary game play using one or more of the graphics from the primary wagering game. For example, the system can analyze the state of a game outcome for the primary wagering game and provide a second chance game. For example, a secondary content controller can analyze the outcome of the primary wagering game to determine that spin results of the primary wagering game resulted in a near-win event. The secondary content controller can then pull funds from a secondary source (e.g., a bet made for the second chance game) and feed spin data and outcome data of the primary wagering game into secondary logic for the secondary game. The secondary content controller can evaluate the spin data and outcome data using the secondary logic. The secondary content controller can then determine a new random game outcome. The secondary content controller can then cause one or more of the reels of the primary wagering game to appear to re-spin using substituted video. The secondary content controller can detect and use copies of the symbols of the primary wagering game in the re-spin. If the second-chance spin results in a win, then the secondary game may pay out according to a similar pay table scale as the primary wagering game. The secondary content controller can then overlay congratulatory video (as well as produce congratulatory sounds) for the second chance win. In some embodiments, while the secondary content controller performs the re-spin, the secondary content controller can lock out the spin button on the primary wagering game so that the player cannot initiate a play of the primary wagering game while the secondary content controller presents the secondary content. For example, the secondary content controller can detect, via SAS controls, a touch input on a screen that relates to the spin button of the primary wagering game. The secondary content controller can intercept the SAS message, and send a SAS response message back to the primary game to not initiate game play until further notice.

In some embodiments, the secondary content controller can capture symbols from the primary wagering game and create a separate side-game using the symbols. In some embodiments, the secondary content controller can generate an escrow on a no-hit.

In some embodiments, the secondary content controller can analyze the game symbols of the primary wagering game and provide a secondary game. The secondary game provides features by which a player can select one of the symbols and place a side-bet on an over/under of how many of those symbols might appear in the primary wagering game on the next spin(s) (e.g., that five cherries will appear in the primary wagering game on the next spin). Then, the secondary controller can analyze the graphical data of the output of the primary wagering game and determine whether that number of symbols actually did appear. Then, the secondary content controller can payout for the side-bet (e.g., to a player account).

Additional Example Operating Environments

This section describes additional example operating environments, systems, networks, etc. and presents structural aspects of some embodiments.

Wagering Game System Architecture

FIG. 10 is a conceptual diagram that illustrates an example of a wagering game system architecture 1000, according to some embodiments. The wagering game system architecture 1000 includes an account server 1070 configured to control user related accounts accessible via wagering game networks and social networks. The account server 1070 can store and track player information, such as identifying information (e.g., avatars, screen name, account identification numbers, etc.) or other information like financial account information, social contact information, etc. The account server 1070 can contain accounts for social contacts referenced by the player account. The account server 1070 can also provide auditing capabilities, according to regulatory rules, and track the performance of players, machines, and servers.

The wagering game system architecture 1000 also includes a wagering game server 1050 configured to control wagering game content, provide random numbers, and communicate wagering game information, account information, and other information to and from a wagering game machine 1060. The wagering game server 1050 includes a content controller 1051 configured to manage and control content for presentation on the wagering game machine 1060. For example, the content controller 1051 can generate game results (e.g., win/loss values), including win amounts, for games played on the wagering game machine 1060. The content controller 1051 can communicate the game results to the wagering game machine 1060. The content controller 1051 can also generate random numbers and provide them to the wagering game machine 1060 so that the wagering game machine 1060 can generate game results. The wagering game server 1050 can also include a content store 1052 configured to contain content to present on the wagering game machine 1060. The wagering game server 1050 can also include an account manager 1053 configured to control information related to player accounts. For example, the account manager 1053 can communicate wager amounts, game results amounts (e.g., win amounts), bonus game amounts, etc., to the account server 1070. The wagering game server 1050 can also include a communication unit 1054 configured to communicate information to the wagering game machine 1060 and to communicate with other systems, devices and networks. The wagering game server 1050 can also include a secondary content controller 1055 configured to communicate with one or more elements of the wagering game system architecture 1000 regarding modifying wagering game graphics, controlling and presenting secondary games, etc.

The wagering game system architecture 1000 also includes the wagering game machine 1060 configured to present a primary wagering game and a secondary wagering game. The wagering game machine 1060 includes a processing unit 1062 configured to manage and control content and presentation of content on the wagering game machine 1060. The wagering game machine 1060 also includes a memory 1063 configured to contain content to present on the wagering game machine 1060. The memory 1063 includes primary game content 1064 for presentation of a primary wagering game on the wagering game machine 1060. The memory 1063 also includes secondary game content 1065. The wagering game machine 1060 can also include a secondary content controller 1067 configured to modify wagering game graphics, control and present secondary games, etc. The wagering game machine 1060 can also include an input/output controller 1068 configured to detect input and provide output for the wagering game machine 1060.

The wagering game system architecture 1000 also includes a secondary game server 1080 configured to provide and/or control secondary game content. The secondary game server 1080 can include a processor 1081 configured to control operations of the secondary game server 1080. The secondary game server 1080 also includes a secondary game content store 1082 configured to store secondary game content. The secondary game server 1080 also includes a secondary content controller 1083 configured to present independent secondary game content via the wagering game machine 1060, communicate regarding modifying wagering game graphics, etc.

Each component shown in the wagering game system architecture 1000 is shown as a separate and distinct element connected via a communications network 1022. However, some functions performed by one component could be performed by other components. For example, the wagering game server 1050 can also be configured to perform functions of the wagering game machine 1060, and other network elements and/or system devices. In other examples, the secondary content controller 1083 shares or distributes operations with the secondary content controller 1055 and/or the secondary content controller 1067. Furthermore, the components shown may all be contained in one device, but some, or all, may be included in, or performed by, multiple devices, as in the configurations shown in FIG. 10 or other configurations not shown. For example, in some embodiments, the wagering game machine 1060 can determine wagering game outcomes, generate random numbers, etc. instead of, or in addition to, the wagering game server 1050.

The wagering game machines described herein (e.g., wagering game machine 1060) can take any suitable form, such as floor standing models, handheld mobile units, bartop models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1000 can be implemented as software, hardware, any combination thereof, or other forms of embodiments not listed. For example, any of the network components (e.g., the wagering game machines, servers, etc.) can include hardware and computer-readable storage media including instructions for performing the operations described herein.

Wagering Game Machine Architecture

FIG. 11 is a conceptual diagram that illustrates an example of a wagering game machine architecture 1100, according to some embodiments. In FIG. 11, the wagering game machine architecture 1100 includes a wagering game machine 1110, with game-logic circuitry 1140 securely housed within a locked box inside a gaming cabinet. The game-logic circuitry 1140 includes a central processing unit (CPU) 1142 connected to a main memory 1144 that comprises one or more memory devices. The CPU 1142 includes any suitable processor(s), such as those made by Intel and AMD. By way of example, the CPU 1142 includes a plurality of microprocessors including a master processor, a slave processor, and a secondary or parallel processor. Game-logic circuitry 1140, as used herein, comprises any combination of hardware, software, or firmware disposed in or outside of the wagering game machine 1110 that is configured to communicate with or control the transfer of data between the wagering game machine 1110 and a bus, another computer, processor, device, service, or network. The game-logic circuitry 1140, and more specifically the CPU 1142, comprises one or more controllers or processors and such one or more controllers or processors need not be disposed proximal to one another and may be located in different devices or in different locations. The game-logic circuitry 1140, and more specifically the main memory 1144, comprises one or more memory devices which need not be disposed proximal to one another and may be located in different devices or in different locations. The game-logic circuitry 1140 is operable to execute all of the various gaming methods and other processes disclosed herein. The main memory 1144 includes a wagering-game unit 1146. In one embodiment, the wagering-game unit 1146 causes wagering games to be presented, such as video poker, video black jack, video slots, video lottery, etc., in whole or part.

The game-logic circuitry 1140 is also connected to an input/output (I/O) bus 1148, which can include any suitable bus technologies, such as an AGTL+ frontside bus and a PCI backside bus. The I/O bus 1148 is connected to various input devices 1150, output devices 1152, and input/output devices 1154. The I/O bus 1148 is also connected to a storage unit 1156 and an external-system interface 1158, which is connected to external system(s) 1160 (e.g., wagering-game networks).

The external system(s) 1160 include, in various aspects, a gaming network, other gaming machines or terminals, a gaming server, a remote controller, communications hardware, or a variety of other interfaced systems or components, in any combination. In yet other aspects, the external system(s) 1160 comprise a player's portable electronic device (e.g., cellular phone, electronic wallet, etc.) and the external-system interface 1158 is configured to facilitate wireless communication and data transfer between the portable electronic device and the wagering game machine 1110, such as by a near-field communication path operating via magnetic-field induction or a frequency-hopping spread spectrum RF signals (e.g., Bluetooth, etc.).

The wagering game machine 1110 optionally communicates with the external system(s) 1160 such that the wagering game machine 1110 operates as a thin, thick, or intermediate client. The game-logic circuitry 1140—whether located within ("thick client"), external to ("thin client"), or distributed both within and external to ("intermediate client") the wagering game machine 1110—is utilized to provide a wagering game on the wagering game machine 1110. In general, the main memory 1144 stores programming for a random number generator (RNG), game-outcome logic, and game assets (e.g., art, sound, etc.)—all of which obtained regulatory approval from a gaming control board or commission and are verified by a trusted authentication program in the main memory 1144 prior to game execution. The authentication program generates a live authentication code (e.g., digital signature or hash) from the memory contents and compares it to a trusted code stored in the main memory 1144. If the codes match, authentication is deemed a success and the game is permitted to execute. If, however, the codes do not match, authentication is deemed a failure that must be corrected prior to game execution. Without this predictable and repeatable authentication, the wagering game machine 1110, external system(s) 1160, or both are not allowed to perform or execute the RNG programming or game-outcome logic in a regulatory-approved manner and are therefore unacceptable for commercial use.

When a wagering-game instance is executed, the CPU 1142 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 1142 when executing the game-outcome logic to determine a resultant outcome for that instance of the wagering game. The resultant outcome is then presented to a player of the wagering game machine 1110 by accessing the associated game assets, required for the resultant outcome, from the main memory 1144. The CPU 1142 causes the game assets to be presented to the player as outputs from the wagering game machine 1110 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human.

The wagering game machine 1110 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

In some embodiments, the game-logic circuitry 1140 is configured to store and execute instructions, which can perform one or more algorithms to modify wagering game graphics, such as those described in association with FIG. 3.

In some embodiments, the wagering game machine 1110 includes a secondary content controller 1137. The secondary content controller 1137 can process communications, commands, or other information, where the processing can modify wagering game graphics, control and present secondary games, etc.

Furthermore, any component of the wagering game machine 1110 can include hardware, firmware, or tangible machine-readable storage media including instructions for performing the operations described herein.

Wagering Game System

FIG. 12 is a conceptual diagram that illustrates an example of a wagering game system 1200, according to some embodiments. In FIG. 12, the wagering game system 1200 includes a wagering game machine 1260 similar to those operated in gaming establishments, such as casinos. With regard to the present inventive subject matter, wagering game machine 1260 may be any type of gaming terminal or machine and may have varying structures and methods of operation. For example, in some aspects, the wagering game machine 1260 is an electromechanical gaming terminal configured to play mechanical slots, whereas in other aspects, the wagering game machine 1260 is an electronic gaming terminal configured to play a video casino game, such as slots, keno, poker, blackjack, roulette, craps, etc. The wagering game machine 1260 may take any suitable form, such as a floor-standing model as shown, handheld mobile units, bar top models, workstation-type console models, etc. Further, the wagering game machine 1260 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The wagering game machine 1260 illustrated in FIG. 12 comprises a gaming cabinet 1211 that securely house various input devices, output devices, input/output devices, internal electronic/electromechanical components, and wiring. The cabinet 1211 includes exterior walls, interior walls and shelves for mounting the internal components and managing the wiring, and one or more front doors that are locked and require a physical or electronic key to gain access to the interior compartment of the cabinet 1211 behind the locked door. In some examples, the cabinet 1211 forms an alcove configured to store one or more beverages or personal items of a player. A notification mechanism 1270, such as a candle or tower light, is mounted to the top of the cabinet 1211. It flashes to alert an attendant that change is needed, a hand pay is requested, or there is a potential problem with the wagering game machine 1260.

The input devices, output devices, and input/output devices are disposed on, and securely coupled to, the cabinet 1211. By way of example, the output devices include a primary display 1212, a secondary display 1214, and one or more audio speakers 1216. The primary display 1212 or the secondary display 1214 may be a mechanical-reel display device, a video display device, or a combination thereof, in which a transmissive video display is disposed in front of a mechanical-reel display to portray a video image superimposed upon the mechanical-reel display. In FIG. 12, the wagering game machine 1260 is a "slant-top" version in which the primary display 1212 is slanted (e.g., at about a thirty-degree angle toward the player of the wagering game machine 1260). Another example of wagering game machine 1260 is an "upright" version in which the primary display 1212 is oriented vertically relative to the player. The displays may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1260. The wagering game machine 1260 includes a touch screen(s) 1218 mounted over the primary display 1212 and/or the secondary display 1214, buttons 1220 on a button panel, bill/ticket acceptor 1222, a card reader/writer 1224, a ticket dispenser 1232 and player-accessible port(s) 1226 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

The player input devices, such as the touch screen 1218, buttons 1220, a mouse, a joystick, a gesture-sensing device, a voice-recognition device, and a virtual input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The wagering game machine 1260 includes one or more value input/payment devices and value output/payout devices. The value input devices are used to deposit cash or credits onto the wagering game machine 1260. The cash or credits are used to fund wagers placed on the wagering game played via the wagering game machine 1260. Examples of value input devices include, but are not limited to, a coin acceptor, the bill/ticket acceptor 1222, the card reader/writer 1224, a wireless communication interface for reading cash or credit data from a nearby mobile device, and a network interface for withdrawing cash or credits from a remote account via an electronic funds transfer. The value output devices are used to dispense cash or credits from the wagering game machine 1260. The credits may be exchanged for cash at, for example, a cashier or redemption station. Examples of value output devices include, but are not limited to, a coin hopper for dispensing coins or tokens, a bill dispenser, the card reader/writer 1224, the ticket dispenser 1232 for printing tickets redeemable for cash or credits, a wireless communication interface for transmitting cash or credit data to a nearby mobile device, and a network interface for depositing cash or credits to a remote account via an electronic funds transfer.

The primary display 1212 or the secondary display 1214 are configured to present wagering game content, such as a plurality of simulated symbol-bearing reels, a plurality of mechanical reels, and/or other video or mechanical presentation consistent with a game format and theme. The wagering game content may also include one or more game-session credit meters and various touch screen buttons adapted to be actuated by a player. A player can operate or interact with the wagering game using the touch screen buttons or other input devices. Game-logic circuitry operates to execute a wagering-game program causing the primary display 1212 or the secondary display 1214 to display the wagering game.

In response to receiving an input indicative of a wager, the reels are rotated and stopped to place symbols on the reels in visual association with paylines such as paylines. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the wagering game machine 1260, following receipt of an input from the player to initiate a wagering-game instance. The wagering game machine 1260 then communicates the wagering-game outcome to the player via one or more output devices (e.g., primary display 1212 or secondary display 1214) through the display of information such as, but not limited to, text, graphics, static images, moving images, etc., or any combination thereof. In accord with the method of conducting the wagering game, the game-logic circuitry transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry is configured to process the electronic data signal, to interpret the data signal (e.g., data signals corresponding to a wager input), and to cause further actions associated with the interpretation of the signal in accord with stored instructions relating to such further actions executed by the controller. As one example, a central processing unit (CPU) causes the recording of a digital representation of the wager in one or more storage media (e.g., a storage unit), the CPU, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU (e.g., the wager in the present example). As another example, the CPU further, in accord with the execution of the stored instructions relating to the wagering game, causes the primary display 1212, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry to determine the outcome of the wagering-game instance. In at least some aspects, the game-logic circuitry is configured to determine an outcome of the wagering-game instance at least partially in response to the random parameter.

In one embodiment, the wagering game machine 1260 and, additionally or alternatively, an external system (e.g., a gaming server), means gaming equipment that meets the hardware and software requirements for security and predictability as established by at least one state's gaming control board or commission. Prior to commercial deployment, the wagering game machine 1260, the external system, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a computer-readable storage medium having stored thereon instructions, which may be used to program a computer system to perform a process according to embodiments(s), whether presently described or not, because every conceivable variation is not enumerated herein. A computer-readable storage medium includes any mechanism that stores information in a form (e.g., software, processing application) readable by a machine (e.g., a computer). For example, computer-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

Some embodiments may take the form of integrated circuits (IC), such as application specific IC (ASIC), a programmable gate array (PGA), or a field programmable gate array (FPGA). For example, an integrated circuit can perform logical manipulations via logical gates, circuitry, etc. Some embodiments may include a design structure that comprises files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:
intercepting video data transmitted from a graphics controller to a display device of a wagering game machine primarily dedicated to playing a regulated casino wagering game, wherein the video data depicts wagering game content for the regulated casino wagering game, and wherein a first content controller, associated with the wagering game, includes game-logic circuitry that causes the graphics controller to generate the video data;
performing a graphical analysis of the video data via a second content controller independent from the first content controller; and
based on the graphical analysis and prior to transmitting the video data to the display device, modifying the video data via the second content controller, wherein the modifying the video data modifies an appearance of a first portion of the wagering game content without modifying an appearance of a second portion of the wagering game content.

2. The method of claim 1, wherein the intercepting the video data occurs after the game-logic circuitry causes the graphics controller to generate the video data and before the video data is presented via the display device of the wagering game machine.

3. The method of claim 1, wherein the modifying the video data is done without involvement by the first content controller, and wherein modifying the video data causes secondary wagering game content to appear in place of the first portion of the wagering game content as if the secondary wagering game content was presented with involvement by the first content controller.

4. The method of claim 1 wherein the graphical analysis comprises:
analyzing a video signal generated from the graphics controller;
detecting, from the video signal, one or more of visual characteristics of a graphical image; and
identifying, by the second content controller, the graphical image based at least partially on the detected one or more visual characteristics.

5. The method of claim 1, wherein the intercepting the video data comprises:
detecting a first video frame rendered by the graphics controller; and
preventing the first video frame from being presented via the display device of the wagering game machine.

6. The method of claim 5 further comprising:
detecting, via the graphical analysis, a first graphical image from the first video frame;
generating a second video frame with a copy of the first graphical image from the first video frame, wherein the modifying the video data comprises overlaying a second graphical image, separate from the wagering game, over at least a portion of the first graphical image in the second video frame; and
providing the second video frame to the display device.

7. The method of claim 6 further comprising, prior to modifying the video data, determining that the overlaying of the second graphical image will not detrimentally affect presentation of one or more of a wagering game outcome of the wagering game and a financial value of the wagering game.

8. The method of claim 6 further comprising,
determining that the first graphical image is from a set of symbols used to specify a wagering game outcome in the wagering game; and
prior to overlaying the second graphical image, determining that the second graphical image is visually distinct from the set of symbols.

9. One or more integrated circuits configured to perform logical operations, the logical operations comprising:
intercepting a first video frame in transit to a display device, the first video frame rendered by a video card of a wagering game machine primarily dedicated to playing a wagering game, wherein a first content controller, configured with wagering-game-logic circuitry; causes the video card to include a depiction of wagering game content in the first video frame;

preventing the first video frame from being presented via the display device of the wagering game machine;

generating, by a second content controller independent from the first content controller, a second video frame that includes a copy of the wagering game content;

performing, by the second content controller, a graphical analysis of the wagering game content; and based on the graphical analysis and prior to transmitting the second video frame to the display device, modifying an appearance of a first portion of the wagering game content, wherein the second content controller causes secondary content to appear to replace the first portion of the wagering game content without causing modification to a second portion of the wagering game content.

10. The one or more integrated circuits of claim 9, wherein the logical operations for modifying the appearance of the first portion of the wagering game content occur without involvement by the first content controller.

11. The one or more integrated circuits of claim 9, wherein a screen size for the second video frame is equivalent to a screen size for the first video frame, wherein a copy of the second portion of the wagering game content is located in the second video frame equivalent to where the second portion of the wagering game content is located in the first video frame, and wherein the secondary content is located in the second video frame equivalent to where the where the first portion of the content is located in the first video frame.

12. The one or more integrated circuits of claim 9, wherein the logical operations for graphical analysis comprise logical operations for:

analyzing a video signal generated from the video card;

detecting, from the video signal, a visual characteristic of a graphical image in the first video frame, the visual characteristic including one or more of a location, shape, texture, edge, shading, color, or text of the graphical image; and identifying, by the second content controller, the graphical image based on the detected visual characteristic.

13. The one or more integrated circuits of claim 9, the logical operations further comprising:

detecting, via the graphical analysis, a first graphical image from the wagering game content;

overlaying a second graphical image, separate from the wagering game content, over at least a portion of the first graphical image in the second video frame; and providing the second video frame to the display device.

14. The one or more integrated circuits of claim 13, the logical operations further comprising, prior to modifying the appearance of the first portion of the wagering game content, determining that the overlaying of the second graphical image does not change a wagering game outcome of the wagering game.

15. The one or more integrated circuits of claim 13, the logical operations further comprising, determining that the first graphical image is from a set of symbols used to specify a wagering game outcome in the wagering game; and prior to overlaying the second graphical image, determining that the second graphical image is visually distinct from the set of symbols.

16. A wagering-game system primarily dedicated to playing a regulated casino wagering game, the wagering-game system comprising:

a secure gaming cabinet for housing components associated with the casino wagering game;

an electronic display device coupled to the gaming cabinet;

a primary content controller configured with game-logic circuitry;

a graphics controller configured to render a video frame in response to data provided by the game-logic circuitry;

an electronic input device coupled to the gaming cabinet, the electronic input device configured to receive a physical input from a player to initiate the casino wagering game and transform the input into an electronic data signal; and a secondary content controller independent from the first content controller, said secondary content controller configured to intercept the video frame from the graphics controller prior to presentation of the video frame via the electronic display device, detect a first image from the video frame, without involvement by the primary content controller, superimpose over the first image a second image different from the first image without causing modification to one or more additional images in the video frame, wherein the second image appears as a replacement to the first image within a wagering game, and provide the video frame for presentation via the electronic display device after the second image is superimposed over the first image.

17. The wagering-game system of claim 16, wherein the secondary content controller is further configured to detect that the first image is associated with one or more of a game outcome of the casino wagering game and financial data of the casino wagering game;

determine a relationship of the first image to a pay table for the wagering game; and indicate, via the video frame, that the second image is a replacement of the first image in the pay table.

18. The wagering-game system of claim 17, wherein the secondary content controller is still further configured to superimpose the second image over a third image that specifies the relationship of the first image to the pay table.

19. The wagering-game system of claim 17, wherein the secondary content controller is configured to, prior to superimposing the second image over the first image; detect data from a source other than the casino wagering game, and select the second image based on the data from the other source.

20. The wagering-game system of claim 19, wherein the data from the other source comprises one or more of environmental data, casino preferences, casino business needs, graphical modification rules, jurisdictional rules, casino event data, a time of day, a date, a subscription to a graphics modification service from a wagering game manufacturer, social network activity, one or more accomplishment of friends in wagering games, player profile information, a player loyalty status, a player account balance, a player preference for a particular type of game theme, a player calendar, or a secondary game.

21. The wagering-game system of claim 17, wherein the secondary content controller is configured to, prior to superimposing the second image over the first image, detect wagering data from the wagering game, and select the second image based on the wagering game data.

22. The wagering-game system of claim 21, wherein the wagering game data comprises one or more of a betting average for the casino wagering game, a game-play rate of the wagering game, one or more accomplishments in the casino wagering game, a win rate for the wagering game machine, a win streak of the wagering game machine, a degree of a win for the casino wagering game, an increase of a winning percentage for the casino wagering game, a moving average payout over time for the wagering game machine, one or more accomplishments that occurs in the casino wagering game for a series of games, a highest payout that the casino wagering game has made within a time frame, a number of spins since a payout of a certain value, a win level, an amount of credits spent, or an amount of credits won.

23. An apparatus comprising:
at least one processor; and
at least one memory device configured to store instructions which, when executed by the at least one processor, cause the apparatus to,
   intercept a video stream in transit to a display device from a graphics controller of a wagering game machine primarily dedicated to playing a regulated casino wagering game, wherein the video stream depicts wagering game content for the casino wagering game, and wherein a wagering game controller is configured to detect wagering activity via an input device of the wagering game machine and, based on the wagering activity, cause the graphics controller to generate the video stream,
   performing a graphical analysis of one or more video frames of the video stream via a secondary content controller independent from the casino wagering game,
   detect game-play data for game play of the casino wagering game, and
   based on the graphical analysis and the game-play data, modify the video stream via the secondary content controller.

24. The apparatus of claim 23, wherein the instructions, when executed by the at least one processor, cause the apparatus to
   based on the graphical analysis, detect at least a portion of the wagering game content depicted in the one or more video frames;
   based on the game-play data select additional content separate from the wagering game content; and
   superimpose the additional content over the at least the portion of the wagering game content depicted in the one or more video frames.

25. The apparatus of claim 23, wherein the game-play data comprises one or more of a betting average for the casino wagering game, a game-play rate of the casino wagering game, one or more accomplishments in the casino wagering game, a win rate for the wagering game machine, a win streak of the wagering game machine, a degree of a win for the casino wagering game, an increase of a winning percentage for the casino wagering game, a highest payout that the casino wagering game has made within a time frame, a number of spins since a payout of a certain value for the casino wagering game, a win level in the casino wagering game, an amount of credits spent in the casino wagering game, or an amount of credits won in the casino wagering game.

* * * * *